(12) United States Patent
Kroon et al.

(10) Patent No.: US 9,813,695 B2
(45) Date of Patent: Nov. 7, 2017

(54) DISPLAY DEVICE WITH FREE FOCUS CAPABILITY

(71) Applicant: KONINKLIJKE PHILIPS N.V., Eindhoven (NL)

(72) Inventors: Bart Kroon, Eindhoven (NL); Marcellinus Petrus Carolus Michael Krijn, Eindhoven (NL); Frederik Jan De Bruijn, Eindhoven (NL); Mark Thomas Johnson, Arendonk (BE); Philip Steven Newton, Eindhoven (NL); Bart Andre Salters, Eindhoven (NL); Siebe Tjerk De Zwart, Valkenswaard (NL); Johannes Henricus Maria Korst, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 401 days.

(21) Appl. No.: 14/356,639

(22) PCT Filed: Oct. 30, 2012

(86) PCT No.: PCT/IB2012/056002
§ 371 (c)(1),
(2) Date: May 7, 2014

(87) PCT Pub. No.: WO2013/068882
PCT Pub. Date: May 16, 2013

(65) Prior Publication Data
US 2014/0300711 A1 Oct. 9, 2014

Related U.S. Application Data

(60) Provisional application No. 61/557,442, filed on Nov. 9, 2011, provisional application No. 61/559,300, filed on Nov. 14, 2011.

(51) Int. Cl.
H04N 13/04 (2006.01)
H04N 13/00 (2006.01)

(52) U.S. Cl.
CPC ..... H04N 13/0402 (2013.01); H04N 13/0033 (2013.01); H04N 13/0406 (2013.01)

(58) Field of Classification Search
None
See application file for complete search history.

(56) References Cited

U.S. PATENT DOCUMENTS 6,064,424 A 5/2000 Van Berkel
6,069,650 A 5/2000 Battersby
(Continued)

FOREIGN PATENT DOCUMENTS

EP 2061261 A1 5/2009
WO 2006017771 A1 2/2006
(Continued)

OTHER PUBLICATIONS

Takaki, Yasuhiro, "High-Density Directional Display for Generating Natural Three-Dimensional Images," Proceedings of the IEEE, vol. 94, No. 3, Mar. 2006, p. 654-663.*
(Continued)

*Primary Examiner* — Joseph Ustaris
*Assistant Examiner* — Edemio Navas, Jr.

(57) ABSTRACT

A display device (40) comprising: a display panel (41) comprising a set of pixels (41R, 41L) the pixels being spatially distributed over the display panel, and each pixel being for providing a light output, the set of pixels comprising a plurality of different subsets (411) of pixels, each subset of pixels comprising one or more pixels of the set of pixels, an imaging unit (42) arranged for imaging the one or more pixels of a subset of pixels to form pixel images on a plurality of view areas on an imaginary plane located at a
(Continued)

first distance in front of the display, the plurality of view areas not overlapping each other, with at least one pixel image of each one of the different subsets of pixels overlapping on a same one of the plurality of view areas, the imaginary plane comprising an imaginary circle having the diameter of the pupil of an eye, and the imaginary circle enclosing at least a part of at least two of the plurality of view areas, where the at least two of the plurality of view areas at least partly enclosed within the imaginary circle differ from each other with respect to at least one of the pixel images therein. The display system may be for one eye only or for two eyes of a viewer or for more eyes of more viewers.

27 Claims, 21 Drawing Sheets

(56) References Cited

U.S. PATENT DOCUMENTS

| | | | |
|---|---|---|---|
| 6,825,985 B2* | 11/2004 | Brown | G02B 27/2214 345/32 |
| 7,095,904 B2 | 8/2006 | Wang | |
| 7,106,274 B2* | 9/2006 | Nishihara | H04N 13/0409 345/204 |
| 7,283,308 B2 | 10/2007 | Cossairt et al. | |
| 7,345,661 B2* | 3/2008 | Miyagawa | G02B 27/2214 345/82 |
| 7,375,885 B2 | 5/2008 | Ijzerman | |
| 7,616,737 B2 | 11/2009 | Kuiper | |
| 8,941,918 B2* | 1/2015 | Kim | G02B 27/0093 348/56 |
| 2005/0270645 A1 | 12/2005 | Cossairt | |
| 2006/0010454 A1 | 1/2006 | Napoli et al. | |
| 2006/0244918 A1 | 11/2006 | Cossairt et al. | |
| 2007/0069978 A1* | 3/2007 | Daiku | G02F 1/13362 345/8 |
| 2011/0096071 A1* | 4/2011 | Okamoto | G02B 27/2214 345/419 |
| 2012/0092576 A1* | 4/2012 | Nose | G02F 1/133377 349/33 |
| 2013/0077154 A1* | 3/2013 | Popovich | G02B 27/2214 359/316 |

FOREIGN PATENT DOCUMENTS

| | | |
|---|---|---|
| WO | 2007072289 A2 | 6/2007 |
| WO | 2007072330 A1 | 6/2007 |
| WO | 2010136944 A1 | 12/2010 |
| WO | 2011145045 A1 | 11/2011 |

OTHER PUBLICATIONS

Takaki et al., "Multi-Projection of Lenticular Displays to Construct a 256-View Super Multi-View Display," Proceedings of the SPIE—The International Society for Optical Engineering, Optics Express, vol. 18, No. 9, 2010, p. 8824-8835.*

Takaki et al., "Super Multi-view Display With a Lower Resolution Flat-Panel Display", Optics Express, Feb. 28, 2011, vol. 19, No. 5 pp. 4129-4139.*

Takaki, Yasuhiro "High-Density Directional Display for Generating Natural Three-Dimensional Images" Proceedings of the IEEE, vol. 94, No. 3, Mar. 2006, pp. 654-663.

Takaki, Yasuhiro et al "Multi-Projection of Lenticular Displays to Construct a 256-View Super Multi-View Display", Proceedings of the SPIE—The International Society for Optical Engineering, Optics Express, vol. 18, No. 9, 2010, pp. 8824-8835.

Reichelt, Stephan et al "Holographic 3-D Displays—Electro-Holography within the Grasp of Commercialization", Advances in Lasers and Electro Optics, 2010, pp. 683-710.

Willemsen, O.H. et al "Fractional Viewing Systems to Reduce Banding in Lenticular Based 3D Displays", Proceedings Int. Disp. Workshops, vol. 12, 2005, pp. 1789-1792.

Smith, Neil R. et al "Agile Wide-Angle Beam Steering with Electrowetting Microprisms", Optics Express, vol. 14, 2006, pp. 6557-6563.

McManamon, Paul F. et al, "A Review of Phased Array Steering for Narrow-Band Electrooptical Systems", Proceedings of the IEEE, vol. 97, No. 6, 2009.

Lee, Jin-Ho et al "Laser TV for Home Theater", Proceedings of SPIE, vol. 4657, 2002.

Lambooij, M. et al "Measuring Visual Discomfort Associated with 3D Displays", Proceedings of SPIE, vol. 7237, 2009.

Adelson, Edward H. et al "Single Lens Stereo with a Plenoptic Camera", IEEE Transactions on Pattern Analysis and Machine Intelligence, vol. 14, No. 2, Feb. 1992, pp. 99-106.

Sun, J.X. et al "P-129: Highly Efficient Stacked OLED Employing New Anode-Cathode Layer", SID 05 Digest, 2005, pp. 797-799.

Zhang, H.M. et al "Blue Organic LEDs with Improved Power Efficiency", IEEE Transactions on Electron Devices, vol. 57, No. 1, Jan. 2010, pp. 125-128.

Kraan, T.C. et al "Modeling Liquid-Crystal Gradient-Index Lenses", Journal of the Optical Society of America, 2007, Abstract Only.

Takaki et al "Super Multi-View Display With a Lower Resolution Flat-Panel Display" Optics Xpress, Feb. 28, 2011, vol. 19, No. 5 pp. 4129-4139.

* cited by examiner

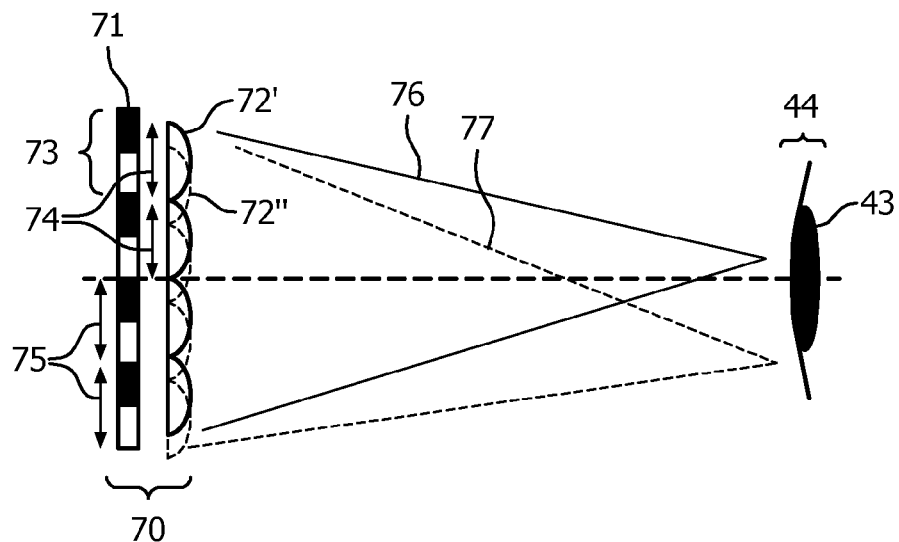
FIG. 7A
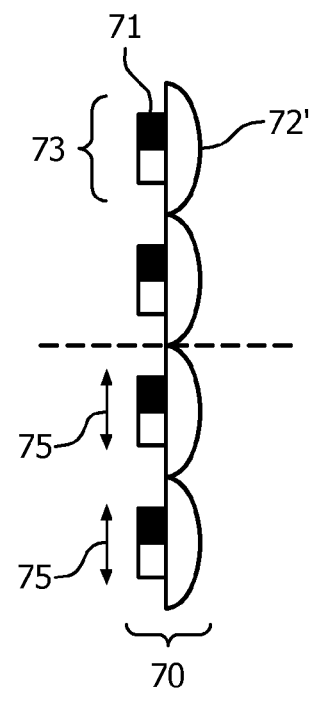 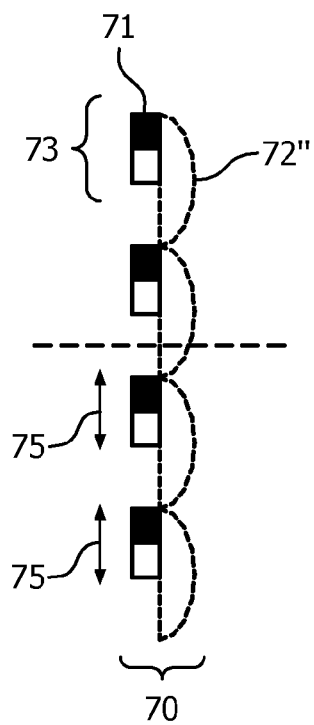
FIG. 7B  FIG. 7C

DISPLAY DEVICE WITH FREE FOCUS CAPABILITY

CROSS-REFERENCE TO PRIOR APPLICATIONS

This application is the U.S. National Phase application under 35 U.S.C. §371 of International Application No. PCT/IB2012/056002, filed on Oct. 30, 2012, which claims the benefit of U.S. Provisional Patent Application No. 61/557,442, filed on Nov. 9, 2011 and U.S. Provisional Patent Application No. 61/559,300, filed on Nov. 14, 2011. These applications are hereby incorporated by reference herein.

FIELD OF THE INVENTION

This invention relates to a display device and method that provide a free focus to the viewer. Particularly, but not exclusively, the invention relates to a stereoscopic display device and method.

BACKGROUND OF THE INVENTION

The majority of 2D displays (TV's, computer monitors and display screens of handheld devices) and 3D (auto) stereoscopic displays (displays without requiring the use of viewer aids to perceive stereoscopic images) available today provide a display of images to the viewer that does not enable the viewer to (re)focus on parts of an image of his choice in a natural way like when observing a real life scene.

When viewed from a particular viewpoint, a real life scene in general has objects positioned nearby the viewer and other objects positioned further away from the viewer, i.e. the scene has depth. For example, in a scene there may be a nearby object in the form of a person standing in front of a further away object in the form of a house in the background. When the viewer focuses on the nearby object, the other objects at different depth are out of focus within a certain margin. Through accommodation, i.e. adjustment of the optical power of his eye lenses to effect a change of focus, the viewer can choose which objects of the scene to bring in focus and thus view sharply. In real life scenes, the viewer has free focus available.

As said, the majority of current displays do not provide the viewer with this free focus option. After all, real life scenes are usually captured (recorded) and displayed such that certain objects with a certain depth range are in focus, while other scene objects are not. Thus e.g. the person of the example scene may be captured and displayed to be in focus while the house is not. The viewer of the display showing this content is required to focus on the screen to perceive the content sharply so that only the objects that were recorded to be in focus are perceived sharply by him. A re-accommodation does not bring the other objects in focus if they do not have the same depth position in the scene as the ones that are in focus. Hence free focus is not available to the viewer, giving a somewhat incomplete viewing experience.

In (auto) stereoscopic displays the lack of free focus is the cause of additional problems for the viewer. Generally, stereoscopic and autostereoscopic displays provide the viewer with depth information through stereoscopic images, i.e. left and right eyes of a viewer receive images of a scene as observed from different viewpoints that are mutually related by the distance of the viewers eyes. An example of a lenticular based autostereoscopic display is disclosed in U.S. Pat. No. 6,064,424.

The available different viewpoint information gives the viewer a depth experience where objects of a scene at different depth are e.g. not only perceived to be positioned at the display screen, but also before or behind the display screen. However, while the image content (objects) representing a scene is thus supposed to be perceived before or behind the screen, the lack of free focus information in the image forces the viewer to focus (accommodate his eye lenses) on the screen of the display despite his need to focus on the actual object depth position in the image. This causes the so-called vergence-accommodation conflict which can cause visual discomfort.

The vergence is the extent to which the visual axes of the two eyes of a viewer are parallel, in that the axes are more converged for objects nearer to the viewer. In natural human vision, there is a direct link between the amount of vergence and the amount of accommodation required to view an object at a given distance sharply. A conventional (auto) stereoscopic display like the one in U.S. Pat. No. 6,064,424 forces the viewer to decouple this link between vergence and accommodation, by maintaining accommodation on a fixed plane (the display screen) while dynamically varying vergence. Vergence-accommodation is described in more detail in WO2006/017771.

Thus, a display that provides the ability to freely focus on the content it displays not only provides a more natural or complete image (2D or 3D) of a scene, it also can reduce the discomfort caused by the vergence accommodation problem in 3D displays. Focusing on infinity, content at infinity should be sharp, but content at screen depth should be as blurred as the display bezel.

Plenoptic cameras are known today and these are able to record 2D images of scenes such that the focus information is present in the image content generated. However, while display of such content on 2D displays using appropriate software may provide a viewer with a choice of what depth regions of a 2D image may be viewed sharply, this must be done using software adjustment of the image displayed while it cannot be done using eye lens accommodation. Hence no free focus in the context of the current invention is provided. WO2006/017771 discloses a 3D display that attempts to address the problem by providing a system using variable focus mirrors or lenses to generate images with image vowels having different focal distances.

Holographic displays also address the problem. Holography is the complete capturing and reproduction of a scene in light. It is based on the diffraction of electromagnetic waves. Holographic displays require both a high resolution and the ability to not only control the luminance but also the phase of light.

Computational holography is the recreation of diffraction patterns of a virtual scene. To compute a full hologram each pixel-voxel combination has to be taken into account. Given that there should be at least as many voxels as Full HD pixels and that the screen resolution is many times the Full HD resolution, this results in staggering computational complexity.

The company SeeReal has developed a more practical holographic display solution that uses beam steering in conjunction with eye tracking to provide a holographic display that produces a correct hologram only for the pupil positions. This is reported in S. Reichelt et al., "Holographic 3-D Displays—Electro-holography within the Grasp of Commercialization", in Advances in Lasers and Electro Optics, pp. 683-710, ISBN 978-953-307-088-9, 2010.

The small beam width allows for a bigger pixel pitch (30-70 µm), not only increasing manufacturing feasibility but also reducing computational cost by orders of magnitude. However, the required 1 TFLOP (1 trillion floating point operations per second) seems still exotic.

A 256 view super multi-view stereoscopic display that provides two views per pupil of an eye of a viewer using multiprojection of lenticular displays to construct the 256 views is described by Yasuhiro Takaki and Nichiyo Nago in ASO Optics Express, vol. 18, No. 9 page 8824 to 8835. This display requires 16 separate flat panel 3D displays.

The invention addresses the need for a display device which enables real depth perception, with the viewer focusing at (or nearer) the depth conveyed by the image rather than focusing at the display screen, and additionally in a way which enables displayed images to be processed with reduced computational complexity.

When used in 3D display, the invention also aims at reducing the visual discomfort of the vergence accommodation problem. The invention allows the aims to be achieved with a display screen with relatively flat form factor.

SUMMARY OF THE INVENTION

The aforementioned object is achieved with a display device and method according to the invention. The invention is defined by the independent claims. The dependent claims provide advantageous embodiments.

The set of pixels preferably, but not necessarily comprise all pixels of the display. With spatially distributed pixels is meant that pixels are arranged next to each other instead of on top of each other in the display panel.

With different subsets of pixels is meant that such subsets of pixels are located on different areas of the display panel. Preferably the one or more pixels of one subset of pixels belong to only one subset of pixels so that all subsets of pixels are entirely different from each other and have different spatial positions on the display panel. Alternatively, these subsets could only partly overlap with each other when there is at least one pixel that belongs to multiple subsets of pixels.

The imaging unit may be arranged over the display panel, i.e. between the pixels and the imaginary plane. In that case directly emitting pixels as e.g in a OLED, or plasma display panel can be used. Alternatively the imaging unit may be located between the pixels and a lighting unit (backlight or laser system) in case of a panel having transmissive pixels such as e.g. those of an LCD panel.

The imaginary plane lies within the field of view in front of the display system and at an operating distance of the display system.

The imaginary circle and/or imaginary further circle can represent the pupil of an eye of a viewer.

The imaging unit provides pixel images to view areas on the imaginary plane. The pixel image areas are substantially equal to the view areas. At least a part of two of these view areas lie within the imaginary circle. This means that these pixel images can enter a pupil of an eye without having to displace the eye.

They can be used to build up subimages of a scene displayed on the display panel. To this end of each one of the subsets of pixels there is at least one pixel imaged to the same one of the plurality of view areas such that each view area comprises a plurality of pixel images overlapping each other substantially entirely. Each of this plurality of pixel images (and thus each view area) may represent a subimage.

Although the pixel images of one view area are not spatially resolved on the imaginary plane, they stem from pixels of different subsets of pixels on the display panel, i.e. they arrive at the imaginary plane from different directions. As a consequence, after having passed the imaginary plane they become spatially resolved again.

Thus, with the imaginary plane thought of as transparent, and placing a projection plane at a distance form the display panel that is larger than the distance between the display panel and the imaginary plane, a plurality of pixel image patterns can be observed. Each one of these pixel image patterns can represent a subimage displayed on the display panel.

When the subimages correspond to the views of one scene but from different viewpoints, an (eye) lens placed in the imaginary circle at the position of the imaginary plane, is allowed to selectively bring objects from the scene in focus on tis retina based on the depth (disparity in the subimages) of these objects in the subimages. Hence free focus is enabled.

The refocus effect can be mimicked by focusing of the pixel image patterns upon a projection plane placed behind the imaginary plane at a distance from the imaginary projection plane that is comparable to the distance of retina and lens of an eye of a viewer and using lenses that have comparable strength to that of an eye of a viewer in multiple focus conditions. It should then be possible to let different sets of pixels from the pixel image patterns to overlap in the different focal states of the lens. Other optical constructions that mimic the optical capability of an eye of a viewer can be used for the same purpose.

The view areas representing (overlapping) pixel images preferably are all equal and/or have the same shape. The shape may be square, rectangular, trapezoid triangular or circular. Neighboring view areas may be abutting leaving no space between them, but may also leave some space between them as long as part of either view area still falls within the imaginary first circle if they have to contribute to the free focus effect at one time.

In an embodiment of the invention, one subset of pixels can be used to provide the different view areas time sequentially. Thus, the light output of the pixels of a subset of pixels may be changed from one to another to create at least two different pixel images within the view areas enclosed (at least partly) by an imaginary circle all within one reconfiguration time equal to or shorter than $1/30$ seconds, or than $1/45$ seconds, or than $1/60$ seconds. This is short enough to give the eye the opportunity to synthesize one image form the subimages despite the fact that they are provided to the eye sequentially. In the mean time, the resolution of (sub)images can be kept high due to the fact that pixels don not have to be divided over the multiple view areas. When each subset of pixels has only one pixel, the resolution within (sub) images can be kept to a maximum value, being the original resolution as determined by the set of pixels. Preferably the reconfiguration time interval is as short as possible to reduce flicker of image and/or optimize free focus ability for an eye. Thus, preferably, the interval is shorter than $1/45$ seconds or even $1/60$ seconds.

The first and second time intervals preferably are single continuous intervals within the reconfiguration time interval.

In another embodiment of the invention a subset of pixels comprises two pixels each one being imaged to only one of the plurality of view areas. In this case at least two of the view areas are generated by spatially distinct pixels within a subset of pixels. Hence, the pixels need to be at least partly divided over the number of view areas, i.e. and thus over the pixel image patterns (subimages). The light outputs of these two pixels for each of the subsets of pixels do not have to be changed for providing the different pixel image patterns. That relaxes the speed of content change of pixels at the cost of some resolution loss due to division of the pixels over the views. A fixed imaging unit (not reconfigurable) suffices for such a display device. Such display panels may be easier or cheaper to manufacture.

In a display with more than one pixel within a subset of pixels these may be arranged in an array of s columns and t rows of pixels, with s and t being integer numbers. The array may have a two-dimensional distribution of pixels such as example given: a triangular, rectangular, square or hexagonal distribution of pixels. Preferably the distribution is rectangular or even square.

The integers s and/or t may be 2, 3, 4, 5, 6, 7, 8, 9 or 10 or even higher than 10. The integer number s and t may be unequal, but preferably they are equal so that the plurality of overlap areas comprises e.g. 4, 9, 16, 25, 36, 49, 64, 81 or 100 overlap areas. More preferably, the shape of the pattern (array) is rectangular or even more preferred, square with columns and rows making 90 degree angle with each other.

In a display of the invention there may be a plurality of view areas that comprises three view areas and the imaginary circle encloses at least a part of the three view areas. An improved free focus effect in terms of more depth levels and/or ease of refocus can be created than with less view areas per imaginary circle (pupil of an eye).

Preferably the three view areas are arranged to form a two-dimensional pattern on the imaginary plane. This provides free focus for objects in the image along two dimensions within the image. The two dimensional pattern preferably comprises the areas in a regular distribution, such as example given a triangular, rectangular, square or hexagonal distribution. More preferably the pattern has a rectangular or square distribution of overlap areas. Preferably the two dimensional pattern is in the form of an array of overlap areas having m columns and n rows of overlap areas, where m and n are integers. The integers m and/or n may be 2, 3, 4, 5, 6, 7, 8, 9 or 10 or even higher than 10. The integer number m and n may be unequal, but preferably they are equal so that the plurality of overlap areas comprises e.g. 4, 9, 16, 25, 36, 49, 64, 81 or 100 overlap areas. More preferably, the shape of the pattern (array) is rectangular or, even better, square with columns and rows making 90 degree angle with each other.

Preferably in the device of the invention at least two of the plurality of view areas are completely enclosed by the imaginary circle. This gives an improved brightness of the display system as all the light of the pixels falls within the circle and thus can enter the pupil of an eye of a viewer. The light output power may be reduced or be brought to a minimum while still experiencing good image brightness, thus providing a power efficient display system with good image brightness. Preferably also a third one or even all of the plurality of overlap areas completely lie within the imaginary circle. When all view areas fall within the imaginary circle, this provides a display system that is capable of providing its output only to the eye of a viewer (at the area enclosed by the imaginary circle having the dimensions of the pupil of an eye of a viewer). Hence it does not provide overlap areas where no viewing occurs and is thus efficient in the use of output patterns for use of creating free focus effect.

A display device of the invention preferably has a number of pixels per subset of pixels that is the same as the number of view areas in the plurality of view areas for all subsets of pixels. This will provide pixels image patterns with uniform number of pixels The imaging unit of the display device may have a plurality of imaging subunits, each imaging subunit being for imaging at least a part of one or more of the pixels of only one subset of pixels, and wherein each imaging subunit comprises an optical element in the form of a lens, and/or a mirror and/or a prism.

The plurality of the imaging subunits is preferably arranged in an array of imaging subunits. The array may correspond with an array of subunits of pixels on the display panel.

Preferably each imaging unit comprises one or more lenses with which the imaging can occur. The lenses may be cylindrical for providing one dimensional view area patterns on the imaginary circle and/or spherical for providing e.g. the two-dimensional patterns of view areas on the imaginary plane. The imaging unit and or imaging subunits may be located directly on top of the pixels such that light output of neighboring subsets of pixels cannot enter one another's light directing units. Alternatively, there may be one, or more light blocking elements between neighboring light directing units to prevent light from one subset of pixels entering the light directing unit that is meant to direct the light output of another (maybe neighboring) subset of pixels.

In one alternative, the number of light directing units is equal to the number of subsets of pixels. Hence, in this embodiment each subset of pixels has its own imaging subunit.

There may be more than one imaging subunit per subset of pixels. At least part of one or more of the pixels may mean one or more subpixels in case pixels are color pixels having subpixels or may mean parts of a pixel area whether or not there are subpixels.

Having more imaging subunits can provide more freedom of imaging individual subsets of pixels or individual parts of subsets of pixels.

In a variation of the display of the invention the imaging subunit comprises a first optical element and a second optical element, where the first and second optical element are arranged such that the first optical element is for directing the light output of at least a part of one or more of the pixels of only one subset of pixels to the second optical element and that the second optical element is for directing the at least part of the light output received from the first optical element to the imaginary plane. This setup of an imaging unit is a.o. advantageous for creating the correct operating distance in combination with a relatively flat from factor of the display device.

A display device of the invention may have pixels wherein each pixel comprises a plurality of subpixels with mutually different colors and the subpixels are stacked on top of each other on the display panel such that they at least partly overlap.

Preferably the subpixels overlap completely. The pixels and their subpixels may be stacked Organic Light Emitting Device (OLED) pixels. In this way a pixel takes a minimum amount of space on the display panel when still being capable of providing a colored output. Hence resolution of a color pixel may be determined by the set of pixels. Since all subpixels of the pixel will be imaged overlapping on a view area, there will be no color breakup due to the imaging. Hence refocus of a viewer does not result in change of color pattern observed. This provides improved color uniformity upon refocus of the eye of the viewer.

Alternatively a, or each pixel comprises a plurality of subpixels with mutually different colors and the subpixels are spatially distributed over the display panel. This provides an easier to manufacture display panel when compared to one having stacked pixels. Within this type of display device the number of subpixels within a pixel is preferably equal to the number of imaging subunits that image at least a part of one or more of the pixels of only one subset of pixels This means that one or more of the subpixel images of one pixel can be made to overlap on a view area by the different imaging subunits available for one. Hence refocus of a viewer does not result in change of color pattern observed. Thus, this provides improved color uniformity upon refocus of the eye of the viewer. The spatial distribution of subpixels also has the advantage that the display panel is easier to manufacture and or address etc than compared to e.g. the stacked subpixel variant.

In a display system of the invention each pixel, or subpixel may comprise a plurality of illumination portions arranged as a one, or two dimensional array of illumination portions. This makes eye tracking and beam steering easier to implement. Preferably the spacing between adjacent illumination portions is larger than the size, along the same spacing direction, of the illumination portions.

A display system as claimed in any of the previous claims wherein a distance between subsets of pixels is larger than a distance between pixels of the same subset of pixels. This layout of pixels can be advantageous when using the imaging unit having multiple imaging subunits where there is one such imaging subunit per subset of pixels.

In a display of the invention that can provide display to two eyes of a viewer, the subsets of pixels are also imaged to an imaginary further circle in a time sequential manner. Hence free focus is provided to each one of the eyes when placed at the imaginary circles while the resolution as determined by the set of pixels is only divided over the multiple view areas for one eye.

The eyes may receive the same information when the pixel images of the view patterns do not differ between the two imaginary circles. Hence the display device is a mono display with free focus for two eyes. Alternatively and preferably the eyes receive different information to make it suitable for use as a stereoscopic display device.

The output for the different eyes can be provided in a similar way when it comes to reconfiguration and timing as pixel images are provided to the view areas for one eye time sequentially (see support of claim 2). Reconfigurable optical units can be used for this type of display device to do the time sequential imaging.

In another embodiment of a display device for more than one eye the set of pixels comprises a further plurality of different subsets (41I) of pixels, each subset of pixels of the further plurality of subsets of pixels comprising one or more pixels of the set of pixels, and the imaging unit (42) is also for imaging the one or more pixels of a subset of pixels of the further plurality of subsets of pixels to form further pixel images on a further plurality of view areas on the imaginary plane, the further plurality of view areas not overlapping each other, with at least one further pixel image of each one of the different subsets of pixels overlapping on a same one of the further plurality of view areas, the imaginary plane comprising an imaginary further circle having the diameter of the pupil of an eye, the distance between the centers of the imaginary circle and the imaginary further circle corresponding to the distance between the centers of the pupils of a left and right eye of a viewer and the imaginary further circle enclosing at least a part of at least two of the further plurality of view areas, where at least two of the further plurality of view areas at least partly enclosed within the imaginary further circle differ from each other with respect to at least one of the further pixel images therein.

This is a display for two eyes where there is a different plurality of subsets of pixels for each eye. Hence, resolution as determined by the set of pixels is reduced based on the division of the available pixels for the two eyes. This display may be combined with time sequential provision of patterns for one eye for the refocus effect.

In a display device providing view areas to at least two imaginary circles, between the centers of the imaginary first circle and the imaginary second circle there is an area on the imaginary plane where no view areas exist. Hence efficient use of pixels can be implemented such that no view areas are provided to positions where there are no eyes of a viewer.

In a display device providing view areas to at least two imaginary circles, the display device can be a stereoscopic display device and at least two of the plurality of view areas at least partly enclosed within the imaginary circle and the at least two of the further plurality of view areas at least partly enclosed within the imaginary further circle differ from each other with respect to at least one of the pixel and further pixel images therein.

In a display device of the invention the plurality of subsets of pixels are arranged in an array of subsets of pixels having k rows and l columns, where k and l are integers. Also preferably the subsets of pixels are distributed over the display panel in a regular fashion. Preferably they are in arranged in an array of rows and columns of subsets of pixels. Preferably, each subset of pixels comprises the same number of pixels In a display panel having multiple sets of pixels for providing the views to multiple imaginary circles, the plurality of subsets of pixels and the further plurality of subsets of pixels area arranged in an array of subsets of pixels having k rows and l columns, where k and l are integers and wherein the subsets of pixels of the plurality of subsets of pixels are in columns with l an odd number and the subsets of pixels of the further plurality of subsets of pixels are in columns with l even number throughout the array.

The plurality of patterns (subimages) for the left eye and the further plurality of patterns (subimages) for the right eye a viewer are now distributed evenly and regularly over the display panel.

The columns can be replaced with rows in case the display and or the viewer rotate with regard to each other. This can be advantageous when rotating the display from landscape to portrait view.

The interchange may be induced by any external input provided by e.g. orientational change of the display as indicated using GPS or inertia, gyroscopic devices or an eye tracking device.

In a display device of the invention the imaging unit is reconfigurable for time sequentially imaging the pixels of a subsets of pixels to the different ones of the plurality of view areas within the imaginary circle and/or the imaginary further circle, and/or, for time sequentially imaging the pixels of the plurality of subsets of pixels and the further plurality of subsets of pixels to the plurality of view areas and the further plurality of view areas. In one alternative this may be done using a mechanically reconfigurable optical unit. For example the unit may include optical elements that may be shortened or elongated by exerting a mechanical force on them. The mechanical force may be provided by piezoelectric devices. In another alternative at the optical element may be electro-optically reconfigurable. Preferably to this end the optical unit comprises optical elements that operate as GRIN, or electrowetting units. Thus, one or more optical elements may be made of GRIN lenses or electrowetting mirrors or lenses.

A display device as claimed in any of the previous claims, comprising a tracking system for determining the position of a pupil of an eye, and an imaging unit control system (76) for controlling the imaging unit in dependence of the position of the pupil of an eye such that the imaginary circle and/or the further imaginary circle when coinciding with one or more pupils of the eyes of a viewer are substantially kept to coincide with these pupils when one or more of the pupils change position The eye tracking may track the position of one eye and the controlling may be for keeping one imaginary circle coinciding with the circumference of the pupil of the same eye. Position may mean the distance of the pupil to the display panel, and/or the horizontal and/or the vertical position in front of the display panel or any combination of the three.

Thus, when the (pupil of an) eye, positioned in a first position such that the imaginary circle coincides with the circumference of the pupil of the eye, moves to a further position, the light output is redirected to the repositioned pupil. The viewer has freedom to move.

Alternatively, the eye tracking may track the position of at least two eyes and the controlling may be for displacing the output light such that one imaginary circle moves from the pupil of one eye to the pupil of another eye. This embodiment is useful for providing time sequentially the same or different output to more than one pupil (eyes) either from one viewer and/or from more than one viewer.

A display device of the invention may have a display controller for providing image data to the display panel, wherein the image data encodes a plurality of subimages, a first one of the plurality of subimages corresponding to a first viewpoint of a 3D scene and a second one of the plurality of subimages corresponding to a second viewpoint of the 3D scene related to the first viewpoint by the width of the pupil of an eye and wherein to each subset of pixels there is provided a portion of the first subimage and a portion of the second subimage.

The display device is adapted to receive this image data. Put another way, the pixels are provided with image data, such that different pixels imaged to the same area of the pupil by the imaging unit together are provided with image data corresponding to a 3D scene as viewed from a single viewpoint. At least two subimages of the 3D scene as viewed from different viewpoints are provided to one imaginary circle (and thus possibly one pupil). For the displays providing view areas to multiple imaginary circles, the features of the dependent claims relating to a plurality of subsets of pixels, the subsets of pixels and the plurality of view areas can equally hold for the further plurality of subsets of pixels, the further plurality of view areas as well as the imaginary further circle.

Unlike in the Tokyo display, views of images can be sent in directions towards a pupil, therewith reducing the number of views needed to achieve the free focus effect. The invention provides a system that is more complex than lenticular systems in that more views need to be rendered. In the pupil tracking version, there is also added complexity in terms of the pupil tracking, beam steering. However, the system is computationally far simpler than real time holographic systems and does not require control of the phase of emitted light.

BRIEF DESCRIPTION OF THE DRAWINGS

Throughout the figures, the same reference numerals indicate the same features. The figures show schematical drawings wherein relative dimensions do not truly represent reality.

FIGS. 7A, 7B and 7C schematically show how the optical unit of the display according to the invention can be designed and/or operated.

FIGS. 11A and 11B respectively show in a schematic way how a GRIN lens can operate and be implemented a display according to the;

DETAILED DESCRIPTION OF THE EMBODIMENTS

The invention provides a display device from which a viewer can experience a free focus effect.

With such a display the light output of the combination of pixels imaged to one given view area of the pupil by the optical unit together can define a subimage of a 3D scene as viewed from a single viewpoint. By this is meant that the view imaged onto this view area and the subimage formed from such a view on the retina of the eye when the pupil of the eye is positioned such that it receives at least part of the view area, corresponds to the view of the 3D scene either from laterally spaced viewpoints with respect to the scene, or from different depth points along a common viewing axis to the 3D scene. The term "viewpoint" should be understood accordingly.

The light provided to the pupil thus may comprise at least two such subimages of the 3D scene that relate to view points that can be observed simultaneously by one eye of a viewer in real life.

Therewith, the eye has the possibility to cause different parts of the at least two subimages to overlap on the retina for a sharp perception of objects at different depth in a scene represented by the subimages through re-accommodation of his eye. This can enhance viewing of images displayed by 2D displays and/or 3D displays.

Part of the concept underlying the approach of the invention is similar to the concept of a plenoptic camera. One of the early papers on this topic is Adelson et. Al. "Single Lens Stereo with a Plenoptic Camera", IEEE Transaction on Pattern Analysis and Machine Intelligence", vol. 14, No. 2, February 1992. This work has been developed, and plenoptic cameras are now commercially available.

In a plenoptic camera, a microlens array is provided over the image sensor plane. Each microlens overlies a set of pixels. The microlenses direct the light coming in from different directions to different underlying pixels of the set of pixels. In this way, a set of pixels from the same position under each microlens together provide an image of the scene as viewed from a particular viewing direction. By image processing of the different viewing direction images, depth information can be obtained. This additional information can then be used to perform refocusing functions, and many other image manipulations, because effectively a partial 3D model of the scene is obtained rather than a single image from a fixed viewing direction. An image recorded by a plenoptic camera does not, however, provide the free focus effect without the proper adaptations to the display displaying such images.

The invention will now be described in more detail. To this end, part of the problem the invention intends to solve and part of the concept of the invention will first be described with reference to the FIGS. 1 to 3.

Figure 1A:
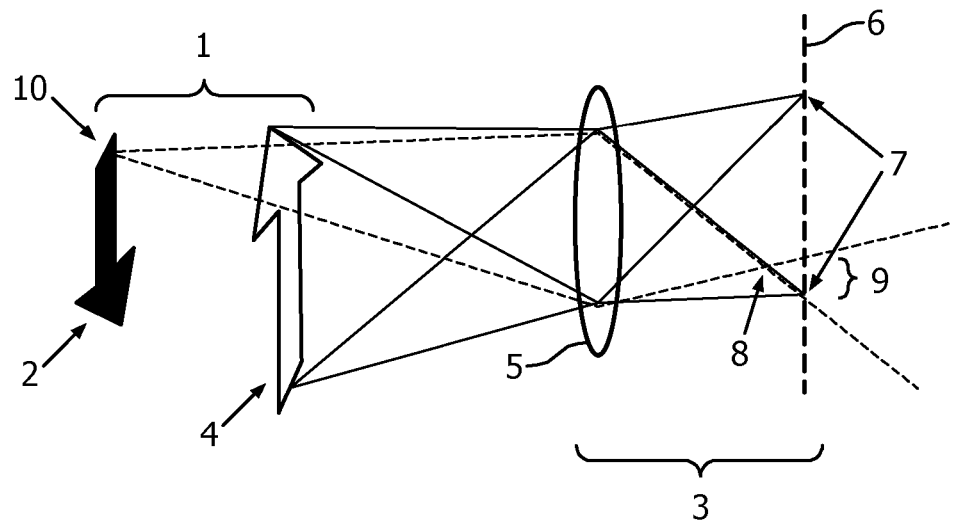
FIGS. 1A and 1B are side and top views, respectively of a schematic representation of how an eye operates when viewing a scene.
Figure 1B:
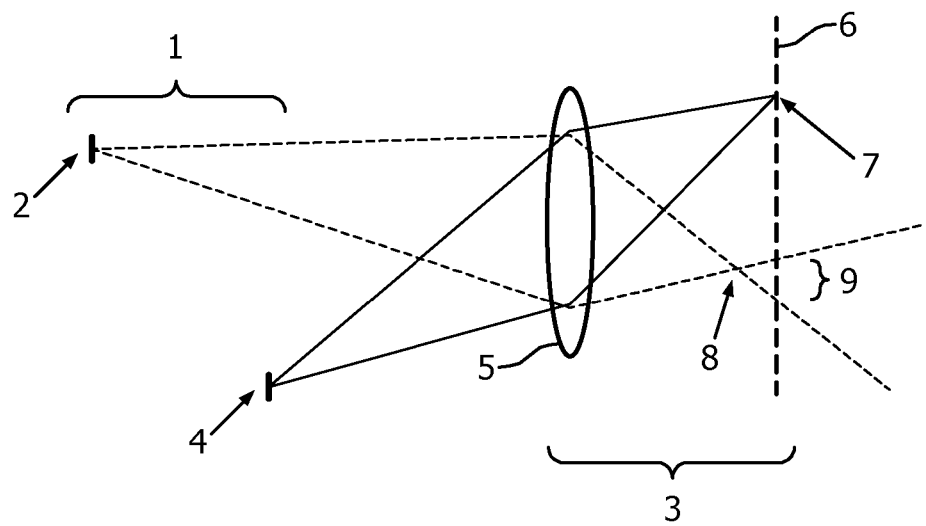

FIGS. 1A and 1B are used to explain the operation of a single human eye when observing a real life (3D) scene from respectively the side and above. The scene 1 includes a small dark arrow 2 far away from the eye 3 and to the right of the scene and a large white arrow 4 nearer the eye 3 and to the left of the scene. The arrows are at different depth in the scene. The pupil and lens of the eye 3 are schematically represented as one item 5 such that, for simplicity, the pupil size is assumed to be so large that the whole lens is exposed to incident light. The retina of the eye is represented schematically with the surface 6.

The eye is focused on the large white arrow 4. Vergence of the eye(s) is not taken into account in the drawings as only one eye is drawn. Also the gaze of the eye along the common viewing axis to the 3D scene (see above) of the eye is not shown. The large white arrow is sharply imaged by the lens 5 onto the retina 6. Thus, every point of the arrow 4 reflects light to the whole area of the pupil 5 and these light rays are all perfectly imaged by the eye into the sharp inverted image on the retina. Light rays for the top and bottom tips of the arrow 4 are shown as solid lines that are directed to diametrically opposite parts of the lens 5. The tips of the arrow are focused by the lens to individual points 7 on the retina 6. The viewer observes the arrow 4 sharply.

However, when the white arrow 4 is in focus, the small dark arrow 2 is not in focus. Two light rays for the base 10 of the arrow are shown dotted. They are seen to be in focus at point 8 in front of the retina 6. Because the dark arrow does not uniquely image to the plane where the retina 6 lies, there is an area 9 of the retina onto which that point 10 of the arrow is imaged. This area, rather than a point, means the small dark arrow is out of focus and is not observed sharply by the viewer.

The viewer needs to refocus (re-accommodate) to make the small dark arrow 2 image to a unique set of points on the retina. However, when he does this, then the arrow 4 will be out of focus and observed as blurred. This situation is not however shown.

Figure 2A:
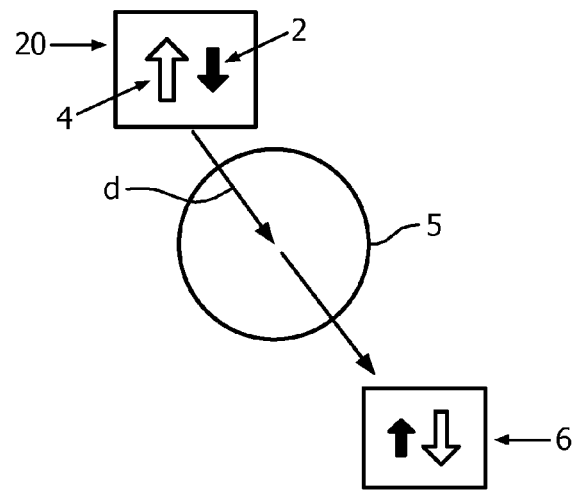
FIG. 2A is a schematic perspective view of what is presented to the retina of one or more eyes of a viewer by a regular 2D display.

FIG. 2A shows what is presented to an eye of a viewer by a regular 2D display. The image 20 displayed on such a display has the arrows 2 and 4 of scene 1 and the image represents one view (see definition of view herein above) of the 3D scene 1 of FIGS. 1A and B. In fact, all viewers are viewing the same view from different positions in front of the display. The image 20 is focused by the eye lens 5 sharply onto the retina 6. Again the pupil area is assumed to be as large as the lens area. The whole image is reproduced sharply on the retina, because it is all presented at the same distance from the viewer's eye, being the viewing distance of a viewers' eye to the display screen.

There is no free focus capability provided for objects of different depths such as arrows 2 and 4, since there is only one flat image (one view of the scene) having a single depth. This principle holds for both eyes of a viewer in case of a regular 2D display of any kind. The way the content of the image 20 is created and/or presented determines what parts (objects) of the image can be observed sharply and what parts (objects) are observed as blurred.

Figure 2B:
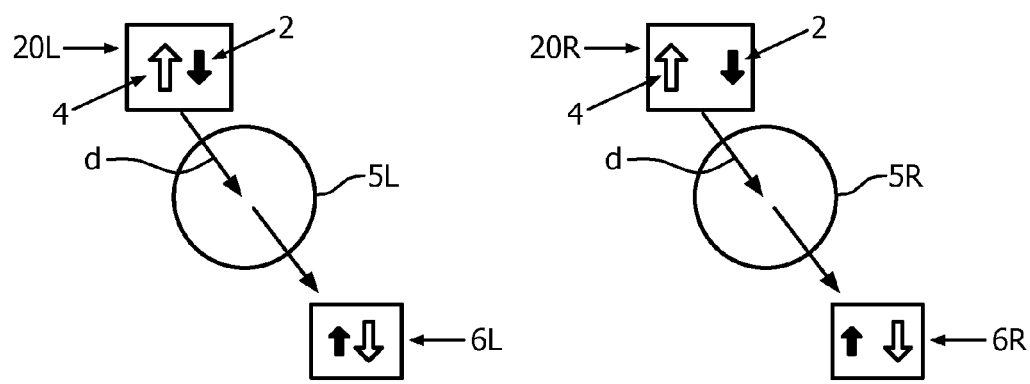
FIG. 2B is a schematic perspective view of what is presented to the respective retinas of the two eyes of a viewer by a regular 3D stereoscopic or autostereoscopic display.

FIG. 2B shows what is presented to the two eyes of a conventional stereoscopic, or autostereoscopic display such as the one of U.S. Pat. No. 6,064,424. The left eye lens 5L is provided with a left view of a scene in the form of display of an image 20L which is focused onto the retina 6L of the left eye in a way similar to that described with reference to FIG. 2A. At the same time the right eye lens 5R is provided with a right view of the same scene 1 in the form of display of image 20R which is focused onto the right eye retina 6R. Since both images represent different views of the same scene 1 that correspond to the different viewpoints of the eye of a viewer (mutual distance approximately 6 cm for humans) the distances between objects in the images 20L and 20R such as between the arrows 2 and 4 (due to their different depth position in the scene 1), are different, i.e. disparity is created. From this disparity the viewer is able to perceive depth. The perception of depth arises amongst others from the interpretation by the brain of the two different views.

When the viewer of the display of FIG. 2B changes its gaze from one object to another (e.g. from arrow 2 to 4), the vergence of his eyes will change accordingly. From this change the viewer perceives a change in depth. However, as opposed to real life, this change in vergence is not accompanied by a change in accommodation of the lenses of the eyes, as all image information is still sharply displayed in the one view per eye on the display panel, just like the situation with the 2D display of FIG. 2A. The only difference between the situations of FIGS. 2A and 2B is that in the latter the images of both eyes have disparity.

As a consequence, there is again no refocus possible. Moreover, there is now also an unnatural stereoscopic viewing experience, because, whereas in normal stereoscopic viewing of humans vergence and accommodation of the eyes are coupled, in the display of FIG. 2B these are decoupled.

Figure 3:
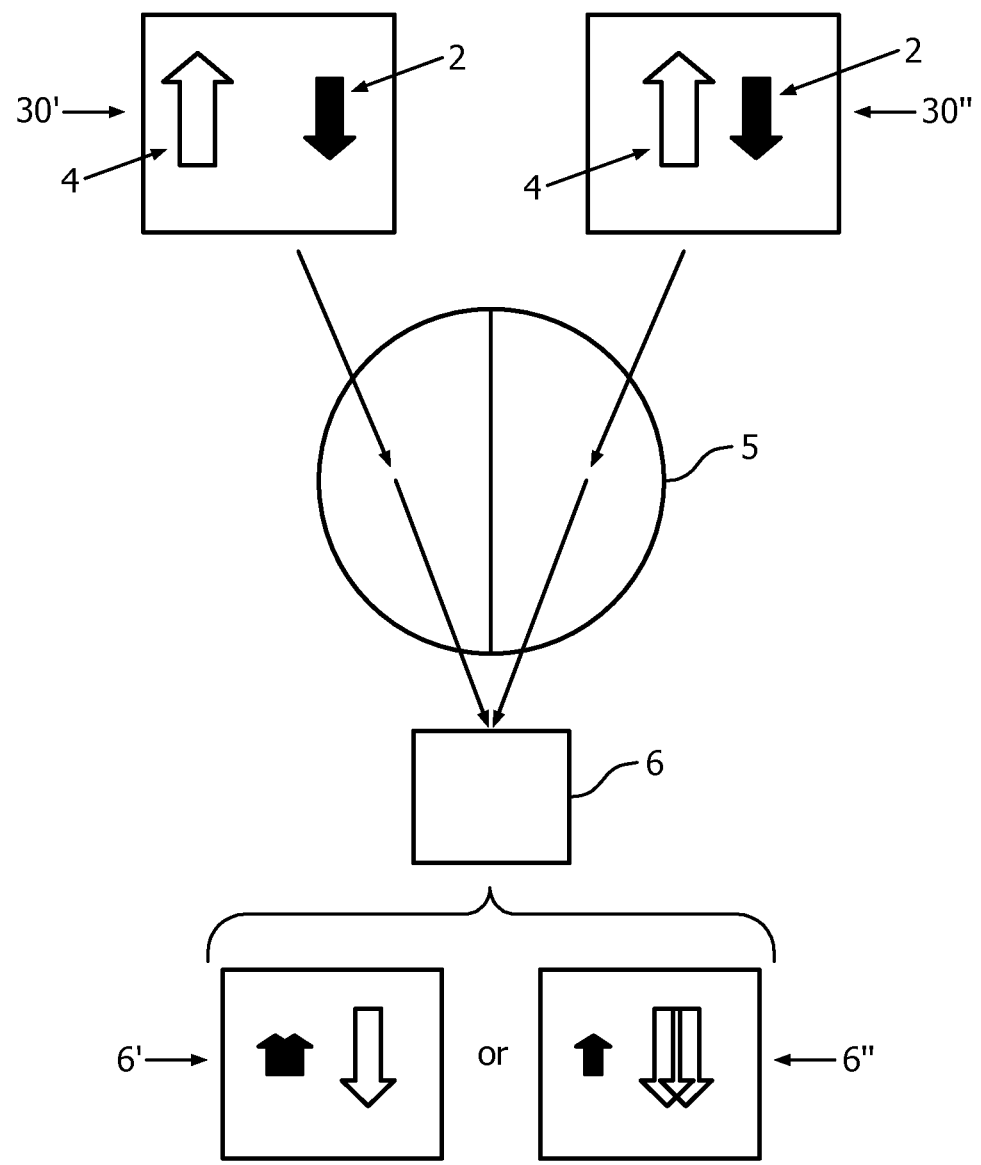
FIG. 3 is a schematic view of what is presented to the retina of one eye of a viewer by a 2D, or 3D display providing free focus according to the invention using only two views of a 3D scene per pupil of the eye.

FIG. 3 shows what is presented to the eye of a viewer using a simple implementation of the invention. The display device of FIG. 3 provides two views (subimages) of a scene (image) representing the scene as observed from two different viewpoints to one eye. In particular, subimage 30' represents a first subimage of the scene 1 which is provided to the left area of lens 5 of the eye. The subimage 30" represents a second view of the scene 1 which is provided to the right area of the lens 5 of the eye. The left and right lens areas do not overlap each other. Again it is assumed that the pupil area is as large as the lens. Of each view (subimage) 30', or 30" a complete image is formed on the retina by the lens even though light of all pixels of a subimage only enters through one and the same area (side) of the lens 5. A certain accommodation of the eye causes parts of the two retinal images to substantially overlap. As with the left and right views in the (auto) stereoscopic case of FIG. 2B, the first and second views (subimages) 30' and 30" are slightly different in accordance with a viewpoint difference between the two parts of the eye lens they are directed to. For example, one can be thought of as the view of the 3D scene 1 from a point in the middle of the left part of the pupil, and the other can be thought of as the view of the 3D scene from a point in the middle of the right part of the pupil. The views are different in the same way that the right and left eye views (subimages) are different, but by a smaller amount. The difference between the views (disparity) is exaggerated in FIG. 3.

When the gaze of the viewer is directed to the white arrow 4, the eye can and will (natural habit) focus on the white arrow 4 which means that the lens 5 images the white arrows of views (subimages) 30' and 30" on the retina in such a way that they overlap as in the case 6'. Consequently, however, in this focal state of the eye, the dark arrows 2 of both views (subimages) 30' and 30" cannot be imaged to the retina 6 such that they overlap, due to the viewpoint related distance differences (disparity) between the arrows 2 and 4 in both of the views 30' and 30". Thus, while the two white arrows will overlap perfectly giving sharp viewing, the smaller dark arrows 2 give the same out-of-focus blurring that occurs in natural viewing of scene 1 as the brain is able to interpret these double images as a single blurred object rather than two distinct sharp objects (in the same way that in nature, an object that is out of focus appears on the retina as set of non-aligned images). To make the darker arrow 2 in focus upon shifting of the gaze of the viewer towards this arrow, the eye needs to refocus (re-accommodate) so that the two different arrows 2 in the subimages 30' and 30" are imaged sharply onto the same points of the retina (overlapping images). The large white arrow 4 will then be out of focus.

Having the possibility of adjusting the focus in dependence of gaze, allows that the coupling between vergence and accommodation found in human vision with two eyes can be used with a display according to the invention.

The free focus effect works for one eye in 2D images, but also for two eyes in 2D or 3D visualization of scenery. In the above, the lens opening (as defined by the eye pupil) was assumed to be as large as the lens itself. In real life it is the pupil diameter that determines the opening, i.e. the area over which light can enter the eye. From here on further the pupil will be used in its original sense, knowing that its opening can vary due to light conditions.

In the above description of the principle of free focus effect as provided by a display according to the invention, there were used only two views per pupil, i.e. the pupil is being represented by two (a left and right pinhole). Each pinhole generates a sharp (view) subimage on the retina, but because these subimages are from slightly different viewpoints, focus or blurring of parts of the subimage is induced within one eye and in a way which depends on the eye focus. The more areas the pupil is divided into, i.e. the more views (subimages) are provided per pupil, the closer the invention replicates nature. At the extreme, the pupil can be thought of as an (infinite) array of pinholes, each one presenting a unique image to the retina.

From a practical viewpoint it is desired to replicate nature as good as possible without having to use a high number of views per pupil. After all, each view will need to be provided by a set of pixel outputs from a display and distributing the available pixels of a display over the number of views may result in a generally unwanted decrease in resolution (decrease of number of pixels available) per view. Although, time sequential display of the different views (subimages) may help reduce spatial distribution, this will put extra constraints on the speed with which the different views (subimages) can be provided by a set of pixels in a display. The invention provides a display that gives the free focus effect while being able to keep the amount of additional views necessary for enabling the free focus effect to acceptable numbers.

Figure 4A:
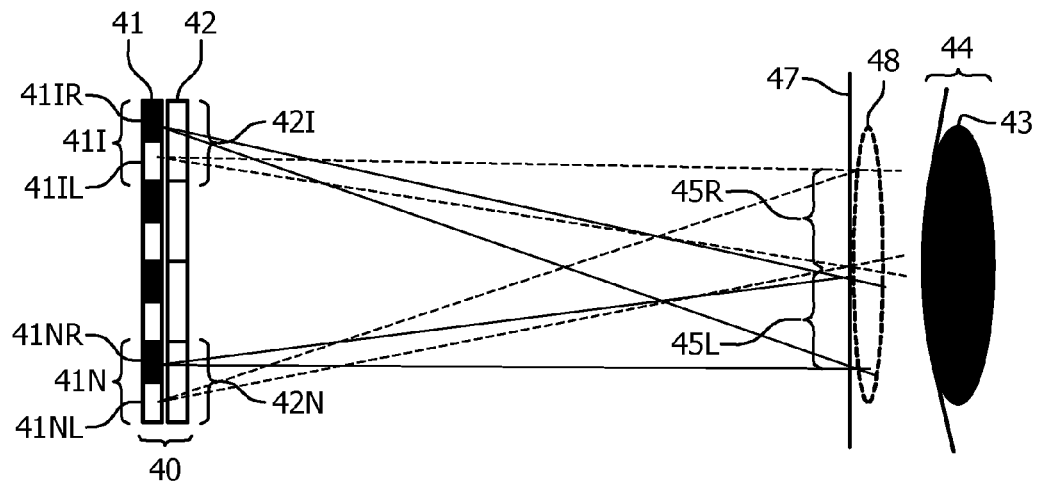
FIG. 4A is a schematic top view of a display device according to the invention and how it can operate.
Figure 4B:
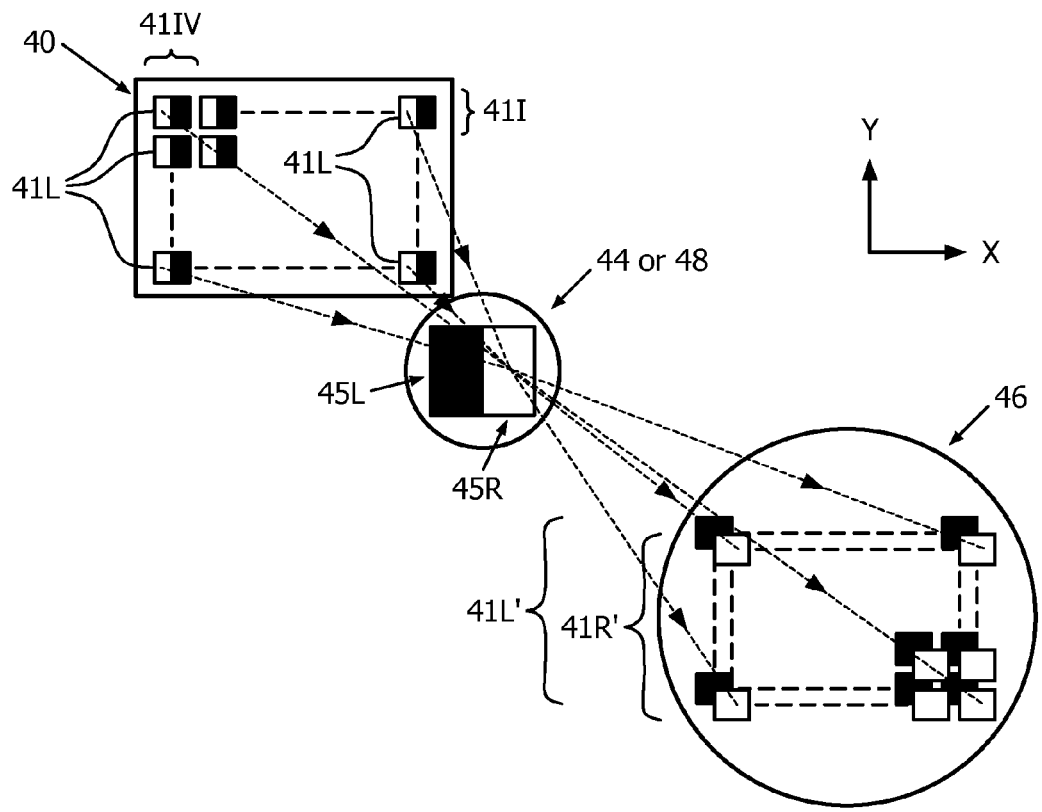
FIG. 4B is a schematic perspective view of the setup and operation of the display of FIG. 4A.

FIGS. 4A and 4B show a display device according to the invention which implements the principle explained here above with reference to FIG. 3. The display device 40 comprises a display panel 41 having a set of pixels subdivided in N subsets of pixels. Each subset of pixels has two pixels as e.g. indicated for subset 41I including the pixels 41IR (black) and 41IL (white) and 41N including pixels 41NR and 41NL. The display device has an imaging unit 42 including a plurality of N imaging subunits (indicated with the transparent rectangles) of which two are indicated with a reference numbers 42I and 42N. The imaging unit is in this case arranged over the display panel 41 and in between the viewer and the display panel. It may also be behind the display panel when there are transmissive pixels. The imaging unit 42 is not shown in FIG. 4B for clarity. There is only one imaging subunit for imaging the pixels of a specific subunit of pixels.

In front of the display is drawn an imaginary plane 47 with an imaginary circle 48. The centre of the imaginary circle may be positioned on a normal to the display panel. The imaginary circle can represent the pupil of an eye of a viewer.

Thus, each subset of pixels 41I to 41N is imaged onto the imaginary plane 47 within the imaginary circle 48 by its respective one of imaging subunits 42I to 42N. Imaging subunit 42I images the pixel 41R to the view area 45L on the imaginary plane 47 within the imaginary circle 48 and images the pixel 41L to the view area 45R on the imaginary plane 47 within the imaginary circle 48. The view areas 41L and 41R do not overlap each other. The two pixels of other subsets are also directed to either one of these view areas 45L and 45R in an analogous way by the other imaging subunits. The view areas may be positionally interchanged within the imaginary circle depending on specific design of the imaging unit (see e.g. FIGS. 5A and 5B and related description).

The beam divergence upon going from the display to the imaginary plane is designed so that a subset of pixels is imaged to a size corresponding to the area of the imaginary circle (pupil) at a standard operating distance of the display device. For this purpose, the light emitted by each pixel may be collimated. For example, the pixel aperture may be 1-10 microns, and the default distance to the imaginary plane from the display plane is 3 m. The beam diverges to a size corresponding to the size of the pupil portion, for example 0.5 mm to 2.5 mm. The display will have a range of operating distances around the designed distance. For example, for a 3 m design, the angular spread of the emitted light is shallow enough that the effect can be viewed in a range approximately 1.5 m to 5 m from the display device. Further examples are given herein below.

The imaging 42 converges the light of the pixels towards the imaginary circle 48; the display panel area will be larger than the imaginary circle area. This is done in such a way that of the plurality of N subsets of pixels, one pixel of each subset is directed to the same view area, i.e. all left pixels 41L (indicated white in FIGS. 4A and 4B) are imaged by the plurality of N imaging subunits to overlap each other on the view area 45R (see the dotted light rays in FIG. 4A) and all right pixels 41R (indicated black in FIGS. 4A and 4B) are directed to overlap on the view area 45L (see solid light rays in FIG. 4A).

Thus, each of the view areas 45L and 45R includes the overlapping images of pixels that together define a view (subimage) displayed on the panel. These displayed views (subimages) can correspond to the images 30' and 30" of FIG. 3.

When a further projection screen e.g. 46 is placed behind the imaginary plane 47, the image patterns 41L' and 41R' observed on such screen show that the non-spatially resolved pixel images of a view area become spatially resolved again after passing the plane to represent the views (subimages) displayed. These subimages 41L' and 41R' correspond to the image 6 of FIG. 3 if the further projection plane would be the retina of the eye 44 having its lens at the position of the imaginary plane 47 with its pupil 43 overlaying the area of the imaginary circle 48. That the overlapping pixels become spatially resolved again is due to the fact that the individual pixel images have been sent to the view area from different directions by the display as they stem from different subsets of pixels distributed over the display panel.

A view or subimage pixels overlapping in one view area on the imaginary plane), together define a view (subimage) of a 3D scene as viewed from a single viewpoint. Thus, within the imaginary circle (and hence a pupil) at least two views of the 3D scene as viewed from different one viewpoints arrive. Therewith the display device of FIGS. 4A and B offers free focus according to the principle explained with reference to FIG. 3, as the focal state of the eye can be used to overlay certain pixels of the patterns 41L' and 41R' which represent the subimages 30' and 30" to arrive at either of the situations 6' or 6" described with reference to FIG. 3.

With the display according to FIGS. 4A and 4B where the multiple views M per subset of pixels (per pupil) is generated using spatially different pixels of the panel, the resolution of a subimage is decreased from the full set of pixel resolution s with a factor M. This can be avoided with time sequential generation of the M views.

Figure 4C:
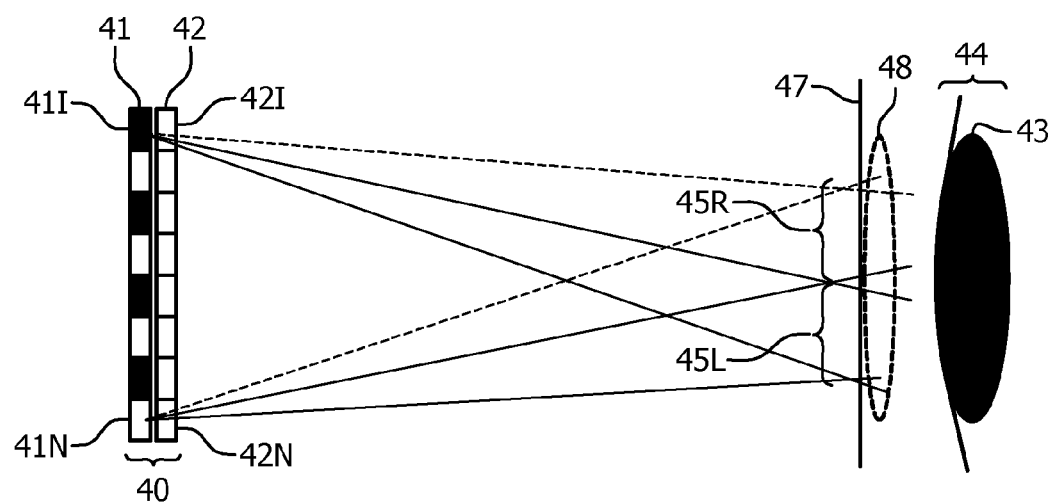
FIG. 4C schematically shows a display device according to the invention and how it is capable of providing two views (subimages) of a 3D scene (image) to one pupil of an eye using one pixel in each subset of pixels for generating the views and providing them to the different view areas time sequentially.

Thus, in the example display device of FIG. 4C there is one pixel per subset of pixels (M=1) for each of the subsets 41I to 41N and the output of one subset of pixels is imaged by only one of the imaging subunits 42I to 42N. This done in such a way that in a first time interval a first pixel output is directed to the view area 45L on the imaginary plane 47 within the imaginary circle 48 and in a second time interval following the first time interval a second pixel output is directed to the other area 45R. Thus, the different views subimages as described with reference to the display device of FIGS. 4A and 4B are now provided to the imaginary plane 47 within imaginary circle 48 and hence the pupil of an eye in time sequential manner. If the time intervals are shorter than 1/30 seconds the eye (brain) is able to interpret the images as arriving simultaneously and thus can use the free focus again. This display may require a reconfigurable imaging unit that can be reconfigured fast enough to direct the first output and the second output to different view areas on the imaginary circle. Ways to implement such imaging units will be described herein below.

The advantage of this display is that each subimage now has the native resolution of the display panel. A fast display panel is required allowing refresh of pixel within the time intervals. Although not impossible with LCD type display panels, Active and often Passive Matrix Organic Light Emitting Diode (OLED) pixel display panels can be more suitable due to the inherent fast pixel response times.

With a display panel pixel of the invention such as the one of e.g. FIGS. 4A and 4C, the resolution of the subimage corresponds to the number of image portions, i.e. the display native resolution needs to be K×M times higher than the perceived image resolution per subimage, where M is the number of pixels per subset of pixels (M is the factor representing the number of views per eye), K is the number of pupils provided with image content simultaneously. The factor K represents a choice. There may be one display providing the image to one eye, or one display providing the image to two eyes (for a single viewer) or even to more eyes in case of multiple viewers per display.

Figure 4D:
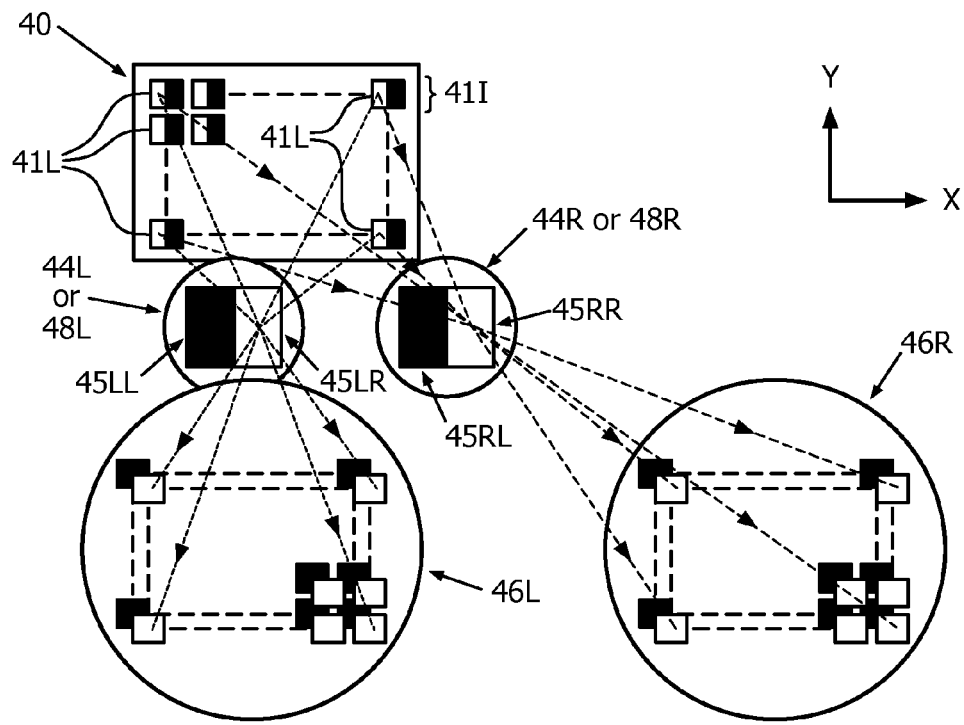
FIG. 4D schematically shows a display device according to the invention that is capable of providing two eyes of a viewer with multiple views (subimages) of a 3D scene (image) where the views of the different eyes are generated using the same subsets of pixels and the respective eyes receive the views time-sequentially.

For example in a display device as depicted in FIG. 4D, the free focus is generated in the same way as described for the display device of FIGS. 4A and 4B. This is however then done in two different imaginary circles 48L and 48R on the same imaginary plane 47 that can correspond to the two pupils 44L and 44R of the eyes of a viewer in a time sequential manner to build a complete image for two eyes both having available free focus. If there is more than one imaginary circle then they may be positioned such that the normal to the display panel crosses halfway the distance between the centers of two imaginary circles. Thus, the imaging unit images the pixels of the subsets of pixels onto one imaginary circle 48L (pupil 44L) first and then to the other imaginary circle 48R (pupil 44R). the timing conditions are in effect the same as the ones described for the display of FIG. 4C, although now they hold for the images of the different eyes instead of the images per pupil. This display may require a reconfigurable imaging unit that can be reconfigured fast enough to direct the first output and the second output to different view areas on the imaginary circle. However, in this design, all of the imaging subunits can be controlled together to provide the directional control. If the display is for displaying mono images (both eyes observing the same views), then the output of the subsets of pixels need not be changed for both eyes. If on the other hand the display is intended to function as a stereoscopic display device, then images of left and right eyes (imaginary circles) must be different, i.e there must be disparity corresponding to the distance of the eyes present. Hence, in the latter case as opposing the mono display, just like for the time sequential display of FIG. 4C, the pixel content needs to be refreshed to generate the stereoscopically different images for the two eyes. Note that refreshing is not necessary for the free focus effect as that is generated from different pixels per subset of pixels like in the display of FIG. 4A. The resolution of subimages is thus the native resolution divided by the number of pixels M per subset of pixels. Ways to implement reconfigurable imaging units will be described herein below.

In a further example not shown, free focus is provided time sequentially as described with reference to FIG. 4C for both eyes. Thus the images for left and right eyes are generated also in a time sequential way as described for the display of FIG. 4D. This example may also require a reconfigurable imaging unit. It has the advantage of offering full native display panel pixel resolution to the viewer as all images are generated in time sequential manner. It however therefore may need a fast display panel as all images must be brought to the eyes in a time short enough for the brain to interpret a complete image within a frame time. Note that depending on the display being a mono or stereoscopic display, refresh time of pixel data must be adjusted. Monoscopic display requires no pixel refresh for the left and right eyes relaxing pixel refresh rate, while stereoscopic display does require fast refresh rate. Thus stereoscopic display requires generation of four different pixel outputs within one image frame time.

The display device can be for one viewer or for multiple viewers. With multiple viewers, the viewers can be processed in time-sequential manner. This of course reduces the illumination duty cycle for each viewer, but with bright directly emitting pixels (such as laser illumination or OLED or EL pixels) the light efficiency enables this.

A tradeoff can be made between spatial and temporal resolution. The spatial resolution may be is represented by N, and the temporal resolution may be represented by M. This is especially important in applications such as TV where the number of viewers is not known beforehand. The display device can serve each of the viewers (or even pupils) one by one (M=1 for one pupil at a time, or M=2 for one viewer at a time), serve all users a lower-resolution image (M=2× number of viewers) or a tradeoff between these two.

Figure 4E:
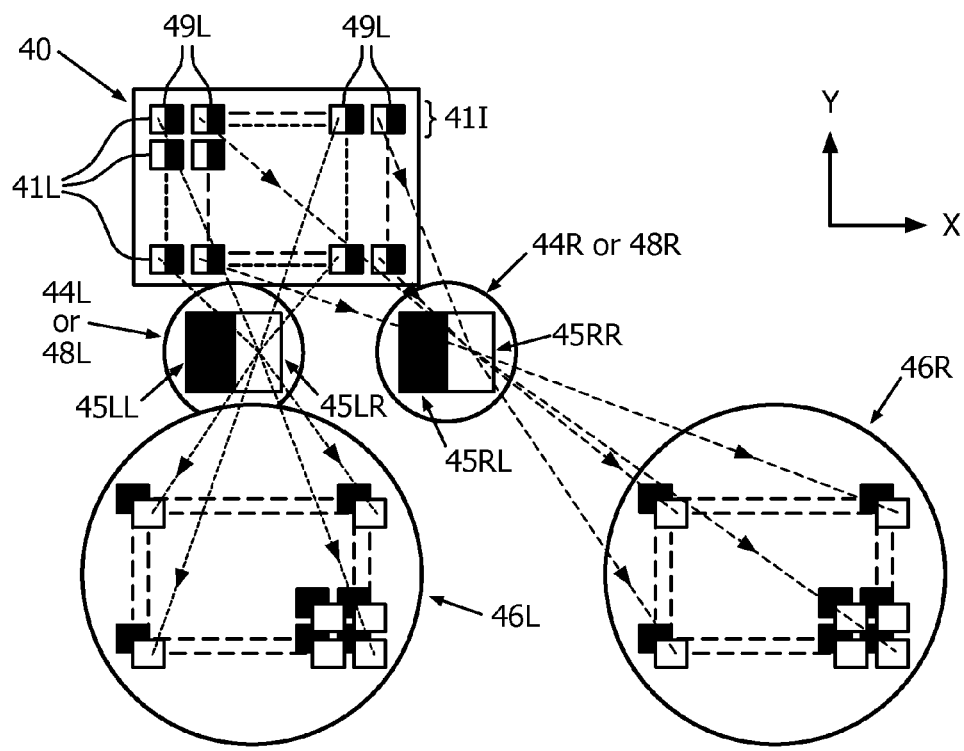
FIG. 4E schematically shows a display device according to the invention that is capable of providing two eyes of a viewer with multiple views (subimages) of a 3D scene (image) where the views of the different eyes are generated using different subsets of pixels.

In the example of FIG. 4E, all views (subimages) provided to the view areas 45LL, 45LR for the left circle 48L (left pupil 44L) and 45RL and 45RR for the right circle 48R (right pupil 44R are generated using different pixels on the panel. There are two plurality of subsets of pixels 49L and 49R each having M=2 pixels per subset of pixels with N subsets of pixels per plurality of subsets of pixels. Although the resolution of the subimages therefore is lowered with the factors M and N, this may represent one of the easiest to implement examples for the imaging unit as it requires in principle no reconfigurable optical unit and/or the display panel as pixel output refreshing needs to be the least fast of all alternatives.

The above described display of the invention is capable of giving a viewer free focus when displaying images. This requires however that the content to be displayed by the system must have the required multiple view per eye information (subimages 30' and 30" with disparity) or must allow generation of such view information using rendering techniques. Such content enables the pixels of the panel to be given their specific light output values (grey value and/or color etc) as based on this view information. Thus, for example, the information of views 30' and 30" in FIG. 3 may be shown on the display of FIGS. 4A and 4B. In that case, the views 30' and 30" must be mapped on certain set of subsets of pixels in the panel taking account of the specific design of pixel panel and the imaging unit.

Rendering and pixel assignment for a display of the invention is comparable to the rendering of images for an autostereoscopic display. Essentially, the ray between the pixel and the position where it hits the pupil is reconstructed. By tracing this ray until it hits the content (image+depth, voxels, triangles, etc.), then the pixel should take the color and/or grey level of the content that has been traced.

For image plus depth content, which is the most likely format for such a screen, this rendering can be done by warping the input image based on the depth map. This is a very efficient process that for instance is already implemented in the display system, but alternatively can be done outside the display system and/or panel.

For a lenticular autostereoscopic display such as the one in U.S. Pat. No. 6,064,424 the rendering is done for every view separately and then the output is combined to form one view-masked image. Lenticular displays have in the order of 9 to 45 views. The system of the invention requires a number of views based on the number of views provided per subset of pixels (e.g. 9, 16 or 25) for representing the views per pupil and if necessary with a different set of views for each of the different look-around positions (i.e. the number of global viewpoints of the stereo scene) required. The different viewpoints to the pupil can be considered as local viewpoints. The number of global scene viewpoints can again be 9 to 45 views. The complexity of the processing compared to a lenticular autostereoscopic display is essentially multiplied by the number of pixels in the subset. This additional complexity is far less than the additional factor of complexity for a holographic display, and it is straightforward to extend the standard lenticular implementation for use in this invention.

Taking the example of two pixels (views) per pupil, the left pixel can be considered as part of an image from a viewpoint which is 3 mm (or so) to the left of the viewpoint for the right pixel. Again, if the pupil is thought of as two side by side pinholes (as mentioned above), the system needs to generate the view as seen by each pinhole. The same image rendering from a 3D scene is implemented as for generating the images for the left and right eyes (here the viewpoints are 6 centimeters or so apart). The blurring or out-of-focus is not present in any individual image—it is the brain's interpretation of the same object in the scene being imaged to multiple areas of the retina. Each individual image is just a flat 2D view of the scene from a given location.

Figure 5A:
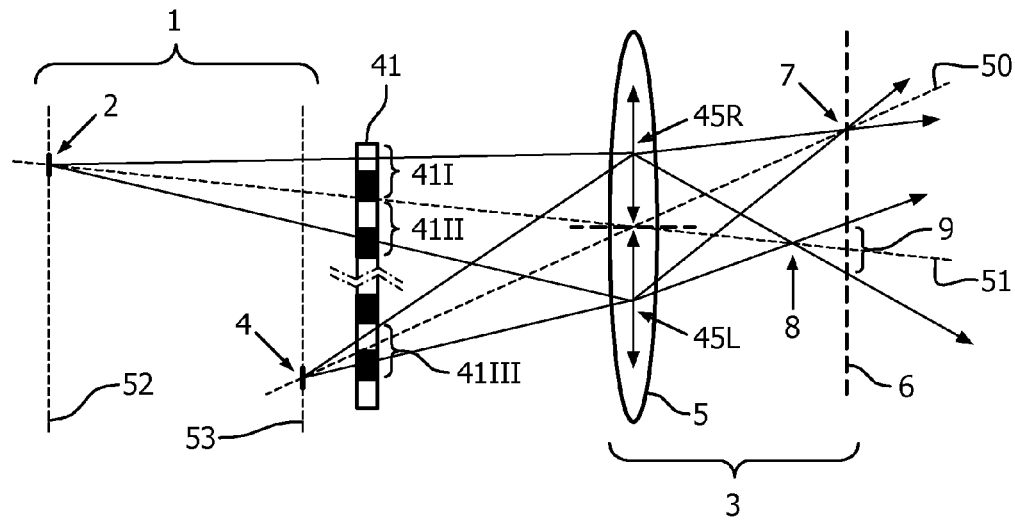
FIGS. 5A, 5B, 5C and 5D schematically show how the view rendering and/or pixel assignment can be done for a display device according to the invention such as for example those of FIGS. 4A to 4E.

FIG. 5A serves to explain the process in some more detail. Part of the referencing in FIG. 5A is related to that of FIGS. 1 to 4. The optical unit in FIG. 5A has not been drawn for clarity and for simplicity is assumed to image the pixels as indicated by the light rays without going into detail of the imaging unit construction. Thus, FIG. 5A represents the scene 1 with arrows 2 and 4 to be observed by an eye 3 of a viewer. The arrows are at different depth 52 and 53 within the scene 1. The eye has a lens 5 and retina 6. A display as described with reference to FIGS. 4A and 4B has been represented with the display panel 41. For convenience of drawing the panel 41 has been drawn as being discontinuous. This is not so in a real example. The display panel has subsets of pixels of which subsets 41I, 41II and 41III are shown. Each of the subsets 41I, 41II and 41III has two pixels; one pixel indicated with a white rectangle and one pixel indicated with a black rectangle. The white pixels of all subsets provide the first view to the pupil and the black pixels the other.

In order to represent the depths in the views provided to the eye, subimages having disparity can be created and shown on the display. The scene contents can be mapped to the pixels using the ray tracing. Thus, the solid drawn common axes 54 and 55 represent imaging of the Left and right views of arrow 4 as based on two directions (viewpoints) from which arrow 4 can be observed. These two directions must be directed to the correct one of the areas 45R and 45L, that is, the left view 55 must be directed to area 45L and the right view 54 must be directed to the area 45R. Hence, the two pixels of sub-set 41III represent the two views of one object point of arrow 4 and these pixels should have the grey level and if applicable color representing these object points. Likewise, it can be observed that the dotted rays 56 and 56 stemming from arrow 2 and representing 2 views of this arrow 2 end up also in the correct areas 45R and 45L. These rays must be assigned to the white pixel of subset 41I and the black pixel of sub-set 41II, respectively. Therefore in the case of the arrow 2, the light output of different views for the same object point of arrow 2 stem from different subsets of pixels, i.e. the two views of the same scene image point are separated by an additional two pixels compared to the situation for arrow 4. This is due to the fact that the rays originate from different depth as those from arrow 4. Such mapping must then be done for all scene object points for at least two depths.

In the FIG. 5A, consider the eye gaze to be directed towards arrow 4 along the common viewing axis 50 (the rotation of the eye lens according to this gaze is not shown). The eye lens 5 is focused on arrow 4. Thus, the solid light rays 54 and 55 of the different views 45R and 45L of arrow 4 are focused in point 7 such that the pixels of the sub-set 41III overlap so that arrow 4 is perceived observed as sharp. This lens focal state of the eye means however that the white pixel of 41I and the black pixel 41II will not overlap on the retina. Instead they will overlap in front of the retina at point 8 while being spatially resolved at the retina area 9 giving a double image on the retina in this area. The brain will interpret that as an out of focus arrow 2.

In accordance with the description herein before, the eye lens may refocus upon shifting the eye gaze to the arrow 2 along the line 51. The eye lens 5 will then refocus (relaxing the lens strength) to bring the required pixels of sub-sets 41I and 41II to overlap on the retina 6 so that the arrow 2 is now observed as sharp. As a consequence, the pixels of sub-set 41III will focus only behind the retina 6, giving an area on the retina where both pixels are spatially resolved. Now the arrow 4 is perceived as a blurred, out of focus arrow.

Hence, when displaying such content then depending on the depth layer the eye is looking at, there is the desired free focus effect. Note however, that information at one depth within a scene is present in all views hitting one pupil. The eye chooses to bring in focus an object of a scene at one particular depth by overlaying the pixels of all views brought to a pupil for a particular object point of the scene. For an object at another depth the eye refocuses to overlay another set of pixels stemming from all views brought to a particular pupil.

Figure 5B:
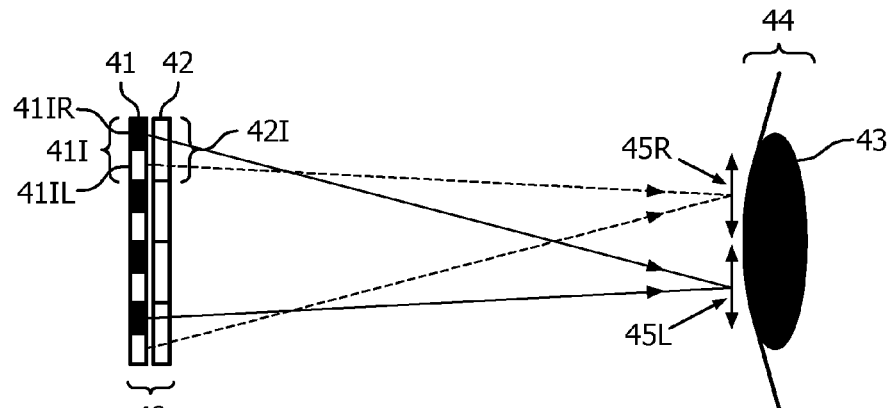

The exact pixel assignment depends on the way the imaging unit works. In a display of FIG. 5B representing the display of FIG. 4A, the imaging subunits redirect the output of the pixels such that light of different pixels within a sub-set of pixels crosses before it hits the pupil of the viewer. In particular the output represented by dotted light rays of view pixels 41R (e.g. 41IR) crosses the output represented by solid rays of view set pixels 41L (e.g. 41IL) that are in the same subset of pixels 41I.

This requires a particular mapping of the correct subimages to the pixels.

Figure 5C:
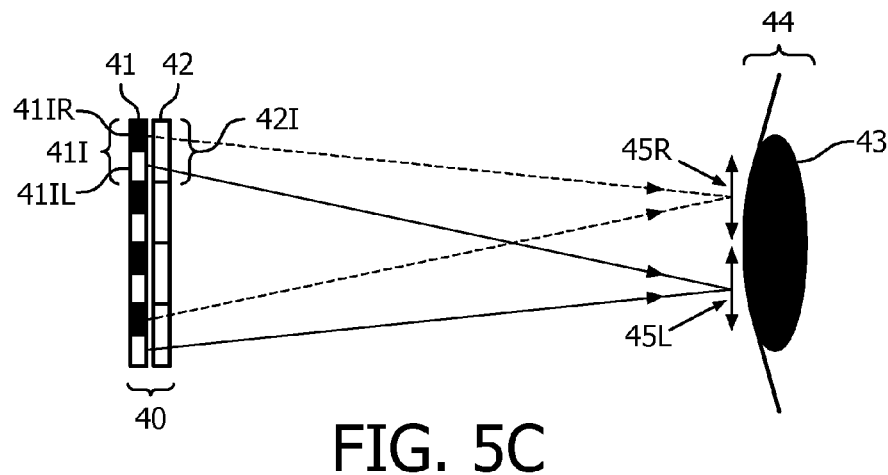

In FIG. 5C the optical unit is constructed such that it redirects the output such that light of pixels of one and the same sub-set of pixels dos not cross before hitting the pupil. Hence pixel mapping must be changed accordingly to still get the right view information on the right area of the pupil.

The display described herein before, with reference to FIGS. 3, 4, and 5A takes the simplest form of the invention with regard to the fact that it provides only two views per pupil for creating the free focus effect. With rendering as in FIG. 5, there will be only two depth layers. Although more depth layers can be represented with a display as the one described in FIG. 5A, such additional depth layers are confined to the region left of the depth layer 48 as there are no pixels left to cover for depth layers in between those of 47 and 48. Furthermore, layer 47 is represented by neighboring pixels and closer depths cannot be represented either. An additional layer would require that the pixels of the two views are even further apart as those for arrow 2 in the FIG. 5A.

Figure 6A:
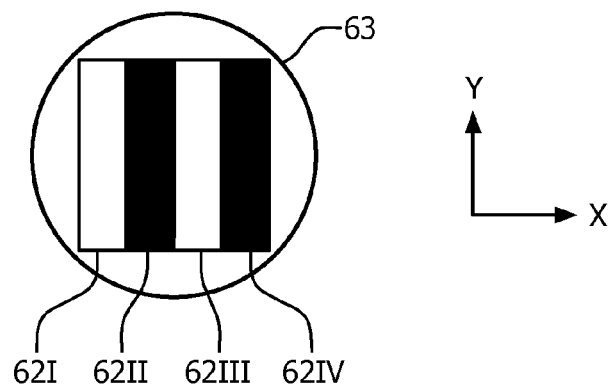
FIGS. 6A, B and C show different view area patterns that can be provided to a pupil of an eye using the display device according to the invention.
Figure 6B:
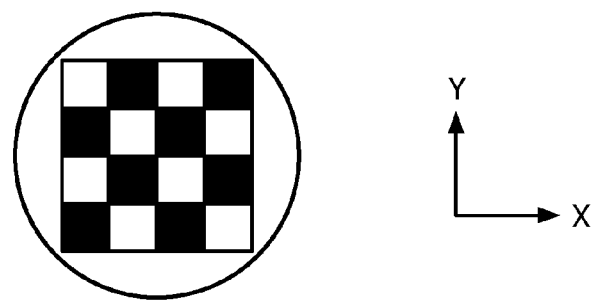
Figure 6C:
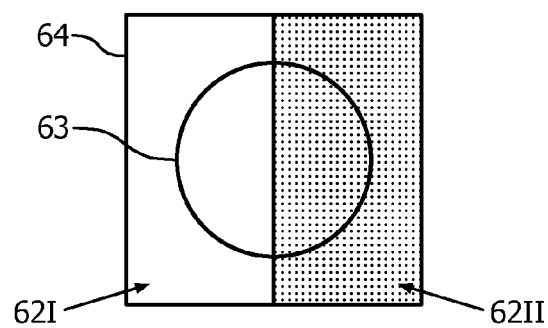

More depths can be created when more views per pupil are used. This is preferred as more views will result in a better replication of nature for the free focus effect (see above). FIGS. 6A to 6C shows, without being limiting, a number of possible view layouts on a pupil. These view layouts can then also be represented in each subset of pixels on the panel, but this does not necessarily have to be the case if time sequential provision of views per pupil is entirely or partially used.

Figure 5D:
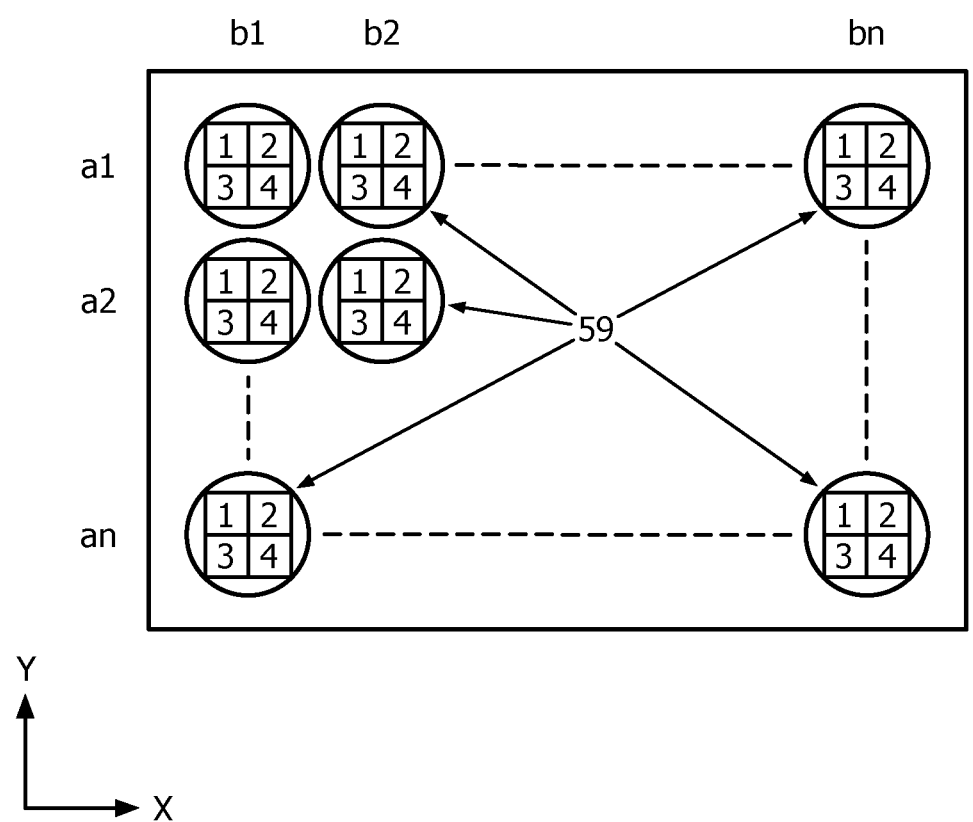

FIG. 5D shows a display panel having pixels arranged in subsets of four pixels. Each of the subsets of pixels has an imaging subunit 59. The subsets of pixels and the imaging subunits are arranged in n rows a1 to an and m columns b1 to bm. This display, when operating as described with reference to FIG. 4A could provide 4 view areas to an imaginary circle (pupil of an eye). One view area in that case has all pixels with same number (e.g. with number 1) of each subset of pixels overlapping. Thus, there are provided 4 subimages to the eye each one comprising the pixels 1, or 2, or 4, or 5. The pixels of one subimage all come from the same relative position within a subset of pixels. Hence the pixel distribution within a subimage will be regular and the same for all subimages.

The display device of the invention provides at least two views within an imaginary circular area that can mimic the pupil of an eye. Typically, for humans the pupil gets wider in the dark but narrower in light. When narrow, the diameter is 3 to 5 mm. In the dark it will approach the maximum distance for a wide pupil 4 to 9 mm. The circle diameter may therefore preferably be any value chosen from 9, 8, 7, 6, 5 or 4 mm. More preferably the circle diameter is any value chosen from 3, 4 and 5 mm. Even in light conditions a large population of viewers will then be able to experience the free focus effect. Even more preferably, the value is chosen to be smaller than 3 mm being for example 2, or even 1 mm. In this case substantially every viewer of the display will be able to experience the free focus effect despite any lighting conditions that influence the pupil dimension.

The view overlap areas may be larger than the imaginary circle (pupil) area. The display will have its effect as long as at least part of two view areas lie within the circular area. Although this was drawn to be the case in the display of FIGS. 4 to 5, the views of that display could also have had the shape as in FIG. 6C such that the projection area 64 comprising the areas for views 62I and 62II are larger than the pupil 63. This would ease the constraints of directing of light towards the one or more pupils to some extent and/or would give a viewer some freedom to move without losing the display free focus effect at least in one direction along the view separation line. However, less light would be entering the eye when light output power per pixel would not change for both types of view areas on the pupil. Therefore, at least two of the view areas preferably lie within the dimensions of the imaginary circle (pupil).

In any case, different views per pupil (thus the different overlap areas) must not overlap each other as that would result in deterioration of the free focus effect, after all, the effect is based on the different content of the different views on a pupil.

The views or view areas on the imaginary plane can form a pattern on the plane in the form of an array of view areas. This may be a one dimensional or a two dimensional Pattern/array. FIG. 6A shows a one dimensional view layout having 4 views 62I, 62II, 62III and 62IV per pupil 63 in the horizontal X direction. Alternatively there may be 3, 5, 6, 7, etc. number of views in the X direction. The multiple views may also be in the Y direction instead of in the X direction. Having such number of views per pupil in only one direction X or Y) will provide the free focus effect based on object information in the views along that direction. Thus although refocusing when done will commence for all directions (the eye lens is after all substantially symmetrical in these directions when operated by the eye's muscles), the incentive to refocus can only come from contrasts in the one direction of multiple views per pupil. This means that it is difficult to focus on objects that have no contrast in the one direction (objects at one depth along that direction). In such circumstances it may be preferred that there is the information in another direction also. To have the effect in all directions and allow refocusing with optimum, there must be more than 2 views imaged on the pupil along the independent X and Y directions, in a two dimensional pattern. Thus, in addition to the number of views per pupil along the X-direction there may be 2, 3, 4, 5, 6, 7 etc. views per pupil along the Y direction. Any combination of the number of views in the X and Y direction is herewith expressly mentioned and possible. Preferably there are as much views in the Y direction as there are in the X direction. This gives a uniform refocus effect in all directions. This latter situation is represented by FIG. 6B for the example of 4 views per pupil 63 in each direction X and Y giving a total of 16 views per pupil. Likewise, there may be 4, 9, 25, 36, 49, 64 etc. views per pupil with equal number of views in X and Y direction.

Alternatively, the views per eye may be provided on an axis that makes an angle of 0 to 180 degrees with the X or Y axis. For example multiple vies may be provided along an axis making an angle of 45 degrees with the X axis. This may give refocusing in both X and Y axis, but again not for scene objects oriented along the axis along which the different views per eye are provided.

The display system of the invention like the ones described herein before may be a color display device having color pixels. Thus each pixel may be able to represent all colors necessary to create a full color display. Such an option could for example be realized using color subpixels, such as Red Green Blue, stacked on top of each other. In this way a so called stacked color RGB pixel is obtained. Stacked pixels can be realized with direct light emitting elements such as OLED. A detailed description of such pixels will not be given here as the person skilled in the art will know how to prepare such pixels from numerous literature references available such as: the article on P1219: Highly efficient stacked OLED employing New Anode Cathode layer by J. X. Sun et. al. in the SID 95 Digest 799 or the article of H. M. Zhang et. a. in *J. Phys. D: Appl. Phys.* 41, No 10, 5108 in 2008 and references cited therein. Stacked color pixels can be implemented in the invention a straightforward way, by replacing each of the pixels with a stacked pixel. Without having to change anything other than what is necessary for addressing the color subpixels, the implementation requires no other changes to be made. Thus, in the display of FIGS. 3 to 5, each of the pixels can be a stacked color pixel.

Alternatively, and as often used in regular displays, a color pixel may comprise spatially resolved Red (R), Green (G) and Blue (B) subpixels. The different colors are then not stacked on top of each other but distribute on the plane of the display next to each other. These will be called regular color pixels in this invention.

I both stacked and non stacked cases, additional to the RGB subpixels of a pixel, extra subpixels with other, or the same colors can be used in the pixel. In particular White (W) and/or Yellow (Y) may be added to create RGBW or RGBY pixels.

In case of regular color pixels, the layout of the subpixels within a color pixel may be any suitable one. The most common one comprises rectangular R, G and B areas that are equally large and that together form a square area.

Figure 8A:
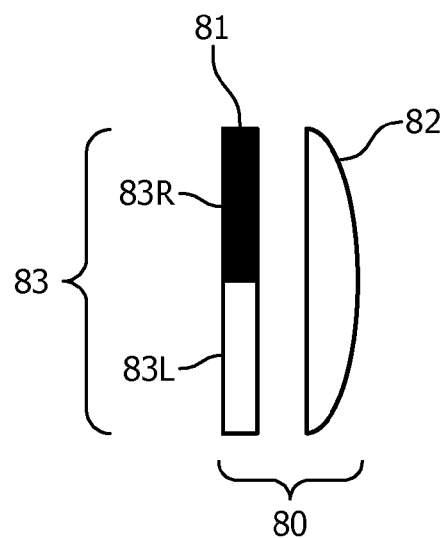
FIGS. 8A to 8G are schematic representations of part of a display panel and optical unit of a display according to the invention where the pixels have subpixels and how these can be provided to the view areas.

To illustrate how to implement RGB color pixels in the display of the invention, FIG. 8A shows display device 80 which is a part of the display of FIG. 4. The display has a pixilated display panel 81 with single color pixels 83R and 83L. Referencing holds for the entire FIG. 8 unless otherwise indicated.

The lens 82 represents an imaging subunit of the imaging unit. It is drawn as a lens, but other buildup in accordance with the invention as described herein may be employed instead. There is a subset 83 pixels 83R and 83L per imaging subunit 82. The whole display has multiple of the units of FIG. 8A, i.e. a plurality of subsets of pixels, but for clarity these have not be drawn. The display of FIG. 8A provides two views to a pupil of a viewer one by pixels 83R and one by pixels 83L in a way as described with reference to FIG. 4A. In order to bring in color to the display of FIG. 8A multiple options exist. Examples are given in FIGS. 8B to G.

Figure 8B:
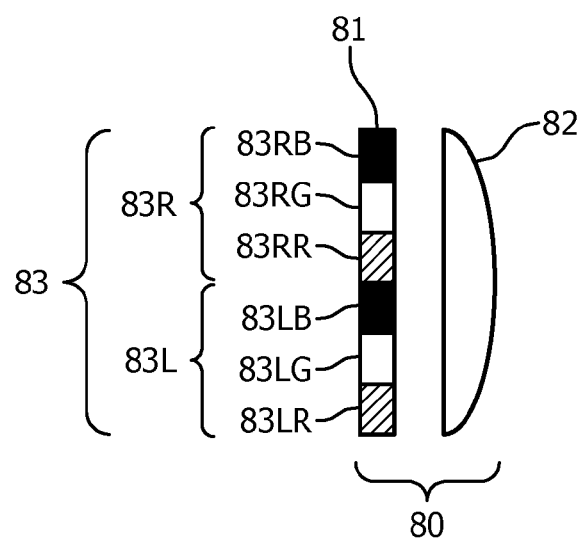
Figure 8C:
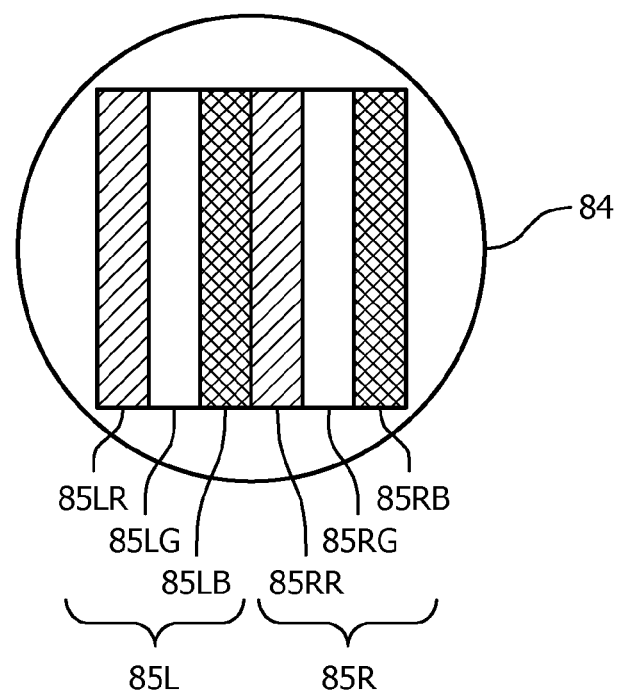

A first option is represented with the display of FIG. 8B where the pixels 83R are subdivided in subpixels Red 83RR, Green 83RG, Blue 83RB and the pixels 83L are subdivided in sub-pixels Red 83LR, Green 83LG, Blue 83LB. Hence the pixilated display panel 41 may have an alternating RGBRGB sequence color (filter) layout. This example will result in a view pattern provided to an imaginary circle (pupil 84) as indicated in FIG. 8C and in a way as described with reference to FIGS. 4A and 5. In FIG. 8C the view 85L comprise the spatially separated colored areas Red 85LR, Green 85LG and blue 85LB of each corresponding pixel of the plurality of subsets of pixels and the view 85R comprises the spatially separated colored areas Red 85RR, Green 85RG and Blue 85RB of each corresponding pixel of the plurality of subpixels. All subpixels of the same color thus overlap. Although this is an easy way to introduce color to the display of the invention, color breakup on the retina can occur, due to the lens of the eye re-constructing the image on the retina according to the principle explained with reference to FIGS. 4 and especially 5A where the eye chooses ensembles of the pixels from all views to overlap depending on depth of an object in the scene filters. Every pixel on the retina will be spatially resolved with regard to its colors, just like when viewing a regular color TV or monitor with spatially resolved pixels. Hence, if small enough, the color breakup may not be a problem.

Figure 8D:
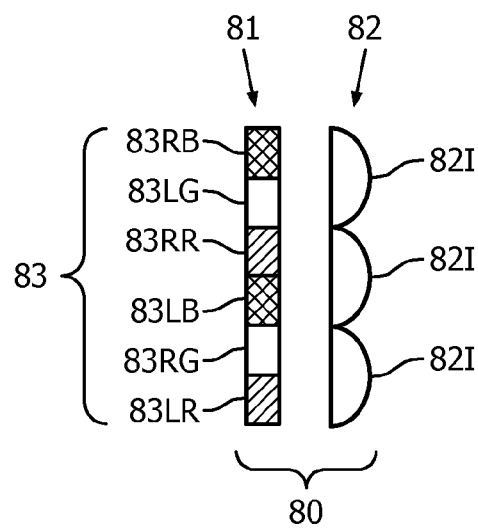
Figure 8E:
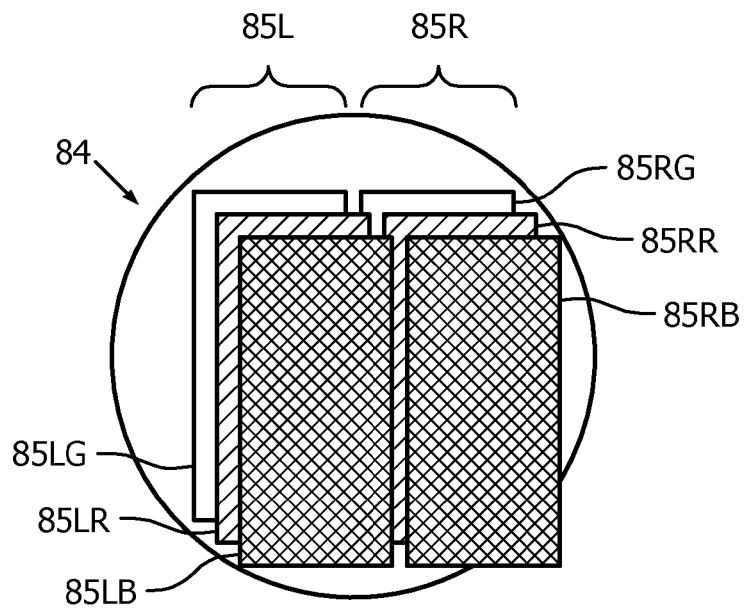

A display 80 of the invention with color, but with reduced color breakup, can be provided with the display of FIG. 8D when it creates a view pattern on the pupil as given in FIG. 8E. In this case the pixilated display panel 81 is identical to the one of FIG. 8B when it comes to the RGBRGB sub-pixel layout, but the imaging unit 82 in fact now comprises 3 imaging subunits per subset of pixels each one imaging only two subpixels to the two views to each pupil. Since these imaging subunits can be designed/controlled individually, the subpixels can be made to overlap three by three on the view areas as seen in FIG. 8E. Thus, more specifically each of two sub-pixels imaged by one of the three imaging subunits 82I ends up in one of the areas 85L or 85R on the pupil 84 of a viewer. In this way the light of subpixels Red 83LR, Blue 83LB and Green 83LG end up in 85L of FIG. 8E. Similarly, the light of sub-pixels Red 83RR, Blue 83RB and Green 83RG end up in 85R of FIG. 8E. The overlapping subpixels can form the pixel of a view and in that way no color breakup within a pixel will occur when the eye lens (pupil) 84 reconstructs the retina image form all overlapping pixels distributed over the views.

From the FIG. 8D it can also be observed that the subpixels of a pixel are distributed over the panel 41 instead of grouped together as mutual neighbors like in the display of FIG. 8B. Thus subpixels assignment to a specific view needs to be accordingly and differs from that of the display of FIG. 8B. It is noted that the units 82I may also be configured or controlled such that the pattern on the pupil of FIG. 8C is reproduced.

Figure 8F:
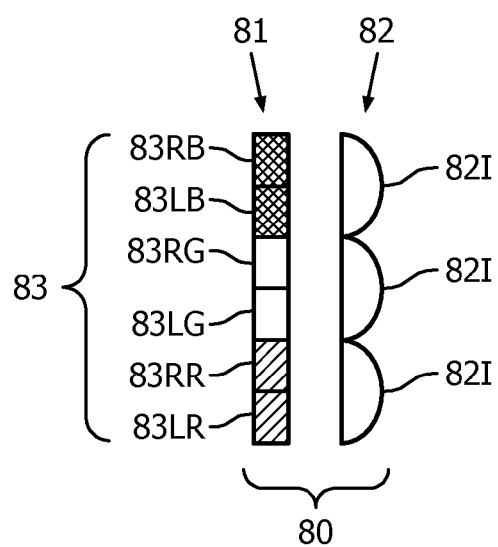

A further modification of the display of FIG. 8D is given in FIG. 8F. In this case the color sequence of sub-pixels in the display panel has been changed into RRGGBB. Like in the display of FIG. 8D, the sub-pixels of a pixel are distributed and the three colors of one pixel overlap in the view pattern provided to the pupil as represented by FIG. 8E. Thus, at the cost of a different subpixel to view assignment with respect to the display of FIG. 8D, color filters in the display may have a larger feature size as they may be twice as broad, thus enabling easier and possibly associated cheaper manufacturing.

Figure 8G:
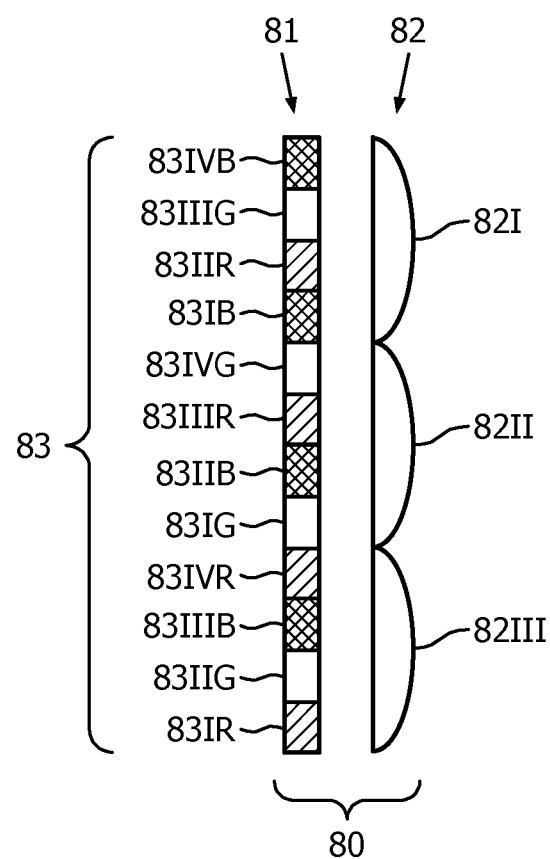

FIG. 8G yet provides another display with color but without color breakup. In this case the pixilated display panel has RGB RGB pixels like the one of FIG. 8D. Like the display in FIG. 8D the one of FIG. 8G has an imaging unit with three imaging sub-units 82I, 82II and 83III per subset of pixels where the subset of pixels has four pixels. The display thus provides four views to a pupil of a viewer in a pattern as e.g. given in FIG. 6A. Thus, a pixel on the panel 41 of FIG. 8G is again distributed (sub-pixels of that pixel are not neighboring on the panel) and provides its output to a view area on the pupil such that the outputs of its sub-pixels overlap on the pupil like in FIG. 8E, but then for four instead of two view areas. Again color breakup is thus prevented. However, compared to the display of FIG. 8D the one of FIG. 8G may have the advantage of easier manufacture as the light directing subunits have larger dimensions.

In general it can be defined that color breakup can be prevented when using an equal number of independently designable or controllable imaging subunits and number of color subpixels per pixel. The number of views can then correspond to the number of subpixels that are imaged by one of the imaging subunits.

An imaging unit of the display of the invention may have one or more imaging subunits. The imaging unit and/or imaging subunits generally include one or more optical elements such as mirrors, prisms and lenses. Preferably the optical elements are lenses and or prisms. Most preferred are lenses. These may have any kind of shape for their lens surfaces such as positive, negative, circular refractive surface and/or parabolic refractive surface. The lens surfaces may be partly or entirely cylindrical or partly or entirely spherical. The edges of neighboring lenses in the imaging unit may be straight and abutting each other forming square like, rectangular or hexagonal lens perimeters over the plane of the imaging unit.

In a display device of the invention such as the ones of FIGS. 3 to 5, the imaging unit may for example be an array of imaging subunits each one including an optical element such as a lens. Such a display 70 is shown in FIG. 7A, which has an array of lenses as an array of imaging subunits. The imaging unit is on top of the display panel 71. In the imaging unit 72' the lens pitch 74 is smaller than the pitch 75 of a subset of pixels 73. This causes that the light of the display converges toward the pupil as illustrated schematically by means of light ray cone 76. The eye 44 of the viewer with pupil 43 is in the middle of the viewing zone as indicated with the normal 71 of the display device, thus receiving the light cone when the imaging unit is in the position 72'.

The direction of the converging light cone can be altered by lateral repositioning of the imaging unit. Thus, e.g by putting it in position 72" the light is directed according to cone 77. The imaging unit is moved as a whole, without changing the pitches of the lenses with respect to those of the subsets of pixels so that the amount of convergence stays the same upon repositioning.

The repositioning can be made dependent on the position of the pupil when an eye tracker is used, which is described herein below.

Varying the pitch of the lenses with regard to the pixel subset pitch 75 alters the amount of convergence, i.e. the azimuth angel of the cone and therewith allows adjustment of the position of the free focus information along the normal 71. This can also be made dependent on eye tracker determined pupil position information.

Pitch alteration may be induced by slight stretching of the optical unit along the pitch alteration direction. The repositioning and/or pitch alteration can be done mechanically using mechanical control devices based on for example micromechanical machines Such control devices preferably have piezoelectric devices for displacing and or stretching the imaging unit. Examples of such mechanically controllable imaging units are described in detail in US patent application publication number 2005/0270645 A1. These can be implemented in the display of the invention.

However, electrical re-positioning and/or resizing and/or reshaping of lenses may also be used as described herein below. Especially so called Graded INdex or electrowetting lenses or mirrors are of use in this respect.

To prevent that light from one subset of pixels enters the imaging subunit that is not for that subset of pixels, (and this could e.g. happen for neighboring subsets of pixels and neighboring imaging subunits), multiple options exist. One is to put the imaging unit directly on top of the pixels. Another is the provision of light blocking features (trenches or black surfaces) between imaging subunits. Yet another is to have subsets of pixels with the space around them not providing pixel light, i.e. to have dark areas around subsets of pixels. An example of this is given in FIGS. 7B and 7C. Upon repositioning the imaging unit 72 from position 72' in FIG. 7B to position 72" in FIG. 7C, no light of the 'wrong' subsets of pixels enters the respective imaging subunits.

Other optical units that are more preferred will be described hereinbelow.

There are two basic existing possibilities for the display technology.

A first possibility is Laser TV. In this case the pixel panel is replaced with a laser TV unit. U.S. Pat. No. 7,375,885 for example discloses the use of a micro lens array placed in front of a 2D Laser TV. The laser while scanning the lenticular visits all views in a regular pattern. The implementation of the display for use in the system of the invention preferably arranged the microlens array (which is the optical unit) to have spherical lenses instead of cylindrical ones. The displayed image content is however different. As only a small part of the viewing space is covered with pupils, the laser illumination only needs to be active for a small portion of the field of view. For this, either the scanning mirrors can move in a non-linear motion (i.e. move directly to the required positions) or the laser can be modulated only for a fraction of the total scanning time. A combination of these approaches can be employed.

The second and preferred option is direct emitting and backlit displays such as e.g OLED or LCD. Direct emitting displays offer the advantage of lower power consumption in the display of the invention, particularly as the light output is directed only to a fraction of the field of view of the display device. Furthermore, they offer the possibility of manufacturing a display device with relatively flat form factor.

In accordance with the display systems of the invention described herein before and especially such ones as described with reference to FIG. 7A to 7C, FIG. 7D shows a display from the front having an imaging unit comprising spherical lenses where there is one lens per subset of pixels and each subset of pixels comprises 16 pixels, 4 in the X direction and 4 in the Y direction. Thus 16 vies can be provided to one eye. There is areas on the display panel that have no pixels. The panel is a pixilated display panel emitter system, which may be LCD or OLED based. Alternatively the lenses added to the display can be designed with one emitter (pixel) and lens system per pixel.

A light directing unit preferably has one or more light directing elements (components) of which at least one may allow for beam steering, so that the light output of the pixels can be directed efficiently to the pupils of the viewer in response to a possible eye tracking and movement of the eye with respect to the display device. One example is already described here above with reference to FIG. 8. Detailed beam steering that can be used for the pixel imaging of the display of the invention has been described in the US patent application publication number 2005/0270645 A1 for the mechanically controllable imaging units. The principle is similar for electrically controllable imaging units in that lenses can be displaced opto-electrically in that case.

Figure 9:
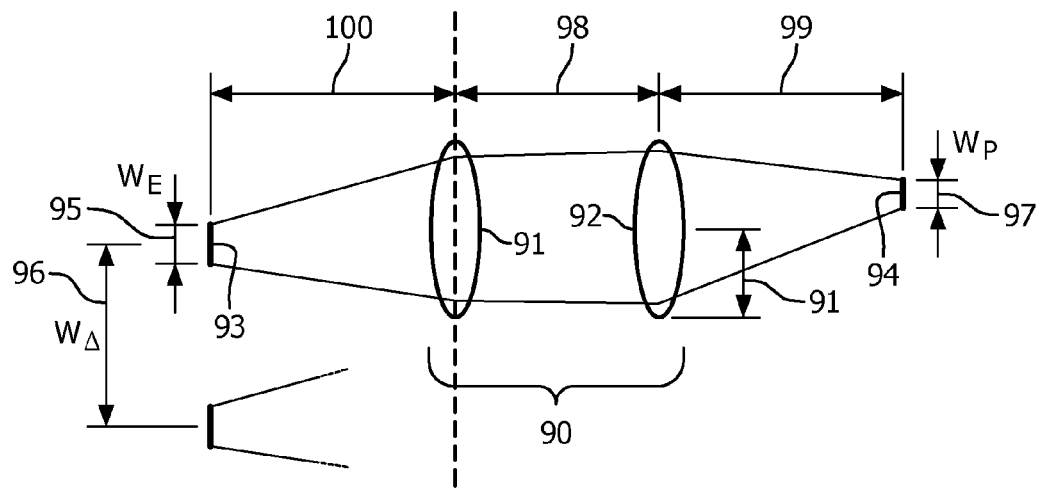
FIG. 9 is a schematic representation of an imaging unit of the optical unit and how it may operate.

To demonstrate that this beam steering for the display of the invention is all possible, with the required light intensity to the viewer and the required range of tracking and avoiding cross talk, a theoretical outline of a possible imaging unit with imaging subunits as provided in FIG. 9 is given below.

FIG. 9 shows a light directing unit 90 of an optical unit, where the unit 90 includes two lenses 91 and 92 for directing the output of an emitter (E) (e.g. a pixel, or sub-pixel of a display or a subset of pixels) 93 to a pupil (P) 94. Distances are again not to scale. A black lining (not shown) can be provided for blocking optical cross talk between adjacent light directing elements.

For, amongst others, simulation purposes a two-lens system is assumed with the ability to move one of the lenses with regard to the other for beam steering. For this analysis, one emitter per lens can be assumed, but in practice more may be used In particular a subset of pixels may be represented by the emitter 93. However, in this case for the purpose of the analysis the lens system thus relates to one view of one pixel (i.e. one pixel of the sub-set of pixels).

The emitter 93 has a width ($w_E$) 95 significantly smaller than the optical directing unit pitch ($w_A$) 96. This would be the pitch of the sub-set of pixels. However, as in this case for the analysis there is only one pixel (emitter 93) per light directing unit 90, the light directing unit pitch 96 is also the pixel pitch. The lens system is designed to create a focused and magnified image on the person's pupil of specified width ($w_P$) 97. The magnification of the system is $m=w_P/w_E$.

For the theoretical analysis, a mechanical method of beam steering is assumed. Others will be described herein below. By moving e.g. lens 91 along the dashed line, the beam can be steered. The lenses 91 of different light directing units are assumed to be movable. This is done for sake of simplicity but this is not the only implementation. Alternative solutions are rotating prisms and electrowetting prisms; which may be preferred if the lenses have to move individually.

To analyze the optical characteristics a single pixel is modeled using the paraxial approximation and perfect lenses, which allows ray transfer matrices to be used. In this model a ray is represented by a vector (x, θ) where x is the position and θ the angle with the optical axis. In the paraxial approximation sin θ≈θ and as such θ should be considered to be the slope of the ray.

The ray transfer matrix for a lens with focal length f is:

$$\begin{pmatrix} 1 & \\ -\frac{1}{f} & 1 \end{pmatrix} \quad (1)$$

A ray travelling a distance d in a medium is represented by the matrix:

$$\begin{pmatrix} 1 & d \\ & 1 \end{pmatrix} \quad (2)$$

The path that the ray travels from the emitter 93, through lens 91 and 92 until it hits the pupil 94 is described by a single matrix M:

$$M = \begin{pmatrix} 1 & d_{BP} \\ & 1 \end{pmatrix} \begin{pmatrix} 1 & \\ -\frac{1}{f_B} & 1 \end{pmatrix} \begin{pmatrix} 1 & d_{AB} \\ & 1 \end{pmatrix} \begin{pmatrix} 1 & \\ -\frac{1}{f_A} & 1 \end{pmatrix} \begin{pmatrix} 1 & d_{EA} \\ & 1 \end{pmatrix} \quad (3)$$

Distance ($d_{AB}$) 88 is the distance between lenses 91 and 92. Distance ($d_{BP}$) 99 is the distance between lens 92 and the pupil 94 and the distance ($d_{EA}$) 100 is the distance between the emitter 93 and lens 91.

The optical system should be focused on the pupil and have a magnification m. This is achieved by constraining the 2×2 matrix M by $m_{11}=m$ and $m_{12}=0$. Eliminating the focal lengths the most general solution to this problem is:

$$f_A = \frac{m d_{AB} d_{EA}}{m d_{AB} + d_{db} + m d_{EA}} \quad (4)$$

$$f_B = \frac{d_{AB} d_{BP}}{d_{AB} + d_{BP} + m d_{EA}} \quad (5)$$

$$M = \begin{pmatrix} m & 0 \\ \frac{d_{BP} + m(d_{AB} + m d_{EA})}{m d_{BP} d_{EA}} & \frac{1}{m} \end{pmatrix} \quad (6)$$

For the system to be useful the beams need to be steered considerably as this determines the display viewing angle. Even though in practice another solution is chosen, to prove the concept lens 91 is moved relative to the optical axis of lens 92 (arrow 91). The ray tracing formula for a ray leaving the emitter at $x_E$ is:

$$\begin{pmatrix} x_P \\ \theta_P \end{pmatrix} = \begin{pmatrix} 1 & d_{BP} \\ & 1 \end{pmatrix} \begin{pmatrix} 1 & d_{AB} \\ -\frac{1}{f_B} & 1 \end{pmatrix} \quad (7)$$

$$\ldots \ldots \left[ \begin{pmatrix} dx_A \\ 0 \end{pmatrix} + \begin{pmatrix} 1 \\ -\frac{1}{f_A} & 1 \end{pmatrix} \begin{pmatrix} 1 & d_{EA} \\ & 1 \end{pmatrix} \begin{pmatrix} x_E - u \\ \theta_E \end{pmatrix} \right]$$

u is the displacement.

Filling in $x_E=0$ and $u=w_A/2$ gives the maximum beam steering:

$$x_P = \frac{w_\Delta \left( \frac{d_{AB}(f_B - d_{BP})}{f_B} + d_{BP} \right)}{2 f_A} \quad (8)$$

Constraining M even more to require a minimal beam steering of:

$$x_P = -A / 2 d_{BP}$$

with A the tangent of the opening angle, a single solution is found constraining three design parameters:

$$f_A = \frac{d_{EA} m w_\Delta}{A d_{BP}} \quad (9)$$

$$f_B = \frac{d_{BP} w_\Delta}{A d_{BP} - (m-1) w_\Delta} \quad (10)$$

$$d_{AB} = \frac{(d_{BP} + d_{EA} m) w_\Delta}{A d_{BP} - m w_\Delta} \quad (11)$$

Remarkably $f_B$ does not depend on $d_{EA}$ 100. It only depends on the application specifications. The lens 92 limits the maximum viewing angle directly as a high $f_B$ in comparison to $w_\Delta$ 96 results in a lens that is too strong to be made. The F-number of a lens is defined as:

$$\varphi = \frac{f}{D'} \quad (12)$$

where D the diameter of the lens and f the focal length. In this case $D=w_\Delta$. For the lenses to be practical $f_A$ and $f_B$ are set by specifying the lens F-numbers. This entirely specifies the system as follows:

$$f_A = w_\Delta \varphi_A \quad (13)$$

$$f_B = w_\Delta \varphi_B \quad (14)$$

$$d_{EA} = \frac{\varphi_A (d_{BP} + (m-1) w_\Delta \varphi_B)}{m \varphi_B} \quad (15)$$

$$d_{AB} = \frac{w_\Delta ((m-1) w_\Delta \varphi_A \varphi_B + d_{BP}(\varphi_A + \varphi_B))}{d_{BP} - w_\Delta \varphi_B} \quad (16)$$

Emitted light that hits the black lining is absorbed and does not contribute to the display brightness.

To estimate the efficiency of the system, the system is compared the system with lenses and small emitter of width $w_E$ against a bare Lambertian emitter of width $w_\Delta$. Counting light that misses the pupil as "inefficient", the efficiency of a bare emitter with width $w_\Delta$ as observed at a distance $d_{BP}$ over a width $w_P$ is:

$$E_{bare} = \left( w_\Delta \sin\tan^{-1} \frac{w_P}{2 d_{BP}} \right)^2 = \frac{w_P^2 w_\Delta^2}{4 d_{BP}^2 \left( 1 + \frac{w_P^2}{4 d_{BP}^2} \right)} \quad (17)$$

For intended values, it can be verified that the aperture of lens 91 is limiting the light output. The efficiency of the system with emitter width $w_E$ and an imaging subunit with aperture $w_A$ at distance $d_{EA}$ thus is:

$$E_{system} = \left( w_E \sin\tan^{-1} \frac{w_\Delta}{2 d_{EA}} \right)^2 = \frac{w_E^2 w_\Delta^2}{4 d_{EA}^2 \left( 1 + \frac{w_\Delta^2}{4 d_{EA}^2} \right)} \quad (18)$$

Combining (17) and (18), the relative efficiency is:

$$E_{rel} = \frac{E_{system}}{E_{bare}} = \frac{w_E^2 (4 d_{BP}^2 + w_P^2)}{w_P^2 (4 d_{EA}^2 + w_\Delta^2)} \quad (19)$$

All variables are specified by the application except for $d_{EA}$, the value of which should be minimized to maximize the efficiency. Through equation (15), this is equivalent to minimizing the only remaining variable $\varphi_A$. Both lenses should be as strong as possible.

The relative efficiency compares luminance (cd/m2) of the system with a bare emitter. For comparing power consumption, the luminous intensity (cd) is important. The emitter is smaller than the pixel pitch and compensation is required for the difference in efficiency, as such:

$$I_{rel} = \frac{I_{system}}{I_{bare}} = \frac{w_E^2}{w_\Delta^2} \frac{E_{bare}}{E_{system}} = \frac{w_P^2(4d_{EA}^2 + w_\Delta^2)}{w_\Delta^2(4d_{BP}^2 + w_P^2)} \quad (20)$$

Table 1 below provides example values for two typical but different situations: televisions and mobile phones.

In both cases a FullHD resolution of the final image seen by the viewer (1920×1080 pixels) is assumed with 36 views divided spatially 6×6 horizontally and vertically. Thus, there are 36 pixels per microlens. Each pixel represents one view of one scene image i.e. scene pixel. In this case each such pixel is a (stacked) Red Green Blue emitter. Emitters, sub-pixels and pixels are square in this case.

In Table 1, $d_{BP}$ is the distance between display and viewer, $w_P$ is the width of the sub-pixel projected on the pupil, $w_\Delta$ is the pixel pitch, $w_E$ is the emitter width, m is the optical magnification, $f_A$ and $f_B$ the focal lengths, $d_{EA}$ the distance between emitters and moveable micro lenses 91, $d_{AB}$ the distance between micro lens 91 and micro lens 92, $E_{rel}$ the relative luminance (compared to a bare emitter of width $w_\Delta$), $I_{rel}$ the relative luminous intensity and A the total opening angle.

mm and $d_{AB}$=245 μm. The results are shown in 2 and show that the efficiency reduces with the angle to the screen.

TABLE 2

| Viewing distance ($d_{BP}$) | Position ($X_P$) | Angle (A) | Efficiency |
|---|---|---|---|
| 3 m | 0 | 0° | 92% |
| 3 m | 0.10 m | | 89% |
| 3 m | 0.25 m | | 79% |
| 3 m | 0.50 m | | 62% |
| 3 m | 0.75 m | | 47% |
| 3 m | 1.00 m | | 32% |
| 3 m | 1.25 m | | 15% |
| 3 m | 1.50 m | 45° | 0% |

This efficiency variation with viewing angle can be compensated. The emitters can be easily ten times brighter, so an automatic gain on the emitter output can be set based on the beam steering angle. This can be implemented in hardware (for instance by manipulating the voltages of select lines) or in software by adjusting the view rendering process (this requires a high dynamic range display).

TABLE 1

| App. | $d_{aP}$ [m] | $w_p$ [mm] | $w_\Delta$ [μm] | $w_\epsilon$ [μm] | m x | $f_A = f_B$ [μm] | $d_{EA}$ [mm] | $d_{AB}$ [μm] | $E_{rel}$ x | $I_{rel}$ x | A ○ |
|---|---|---|---|---|---|---|---|---|---|---|---|
| TV I | 3 | 1 | 81 | 2 | 500 | 81 | 6.1 | 163 | 0.923 | 0.00066 | 45 |
| TV I | 3 | 1 | 81 | 5 | 200 | 81 | 15 | 162 | 0.968 | 0.0039 | 45 |
| TV I | 3 | 1 | 81 | 10 | 100 | 81 | 30 | 162 | 0.984 | 0.015 | 45 |
| TV II | 3 | 6 × 1 | 486 | 6 × 2 | 500 | 486 | 6.5 | 1 mm | 0.640 | 0.00095 | 47 |
| TV II | 3 | 6 × 1 | 486 | 6 × 5 | 200 | 486 | 15 | 988 | 0.829 | 0.0045 | 46 |
| TV II | 3 | 6 × 1 | 486 | 6 × 10 | 100 | 486 | 30 | 980 | 0.909 | 0.017 | 45 |
| Phone | 0.5 | 6 × 1 | 50 | 6 × 1 | 1000 | 50 | 0.55 | 105 | 0.582 | 0.025 | 48 |
| Phone | 0.5 | 6 × 1 | 50 | 6 × 2 | 500 | 50 | 1.0 | 103 | 0.753 | 0.077 | 46 |
| Phone | 0.5 | 6 × 1 | 50 | 6 × 5 | 200 | 50 | 2.5 | 101 | 0.889 | 0.4 | 46 |

For the television case, typical values are assumed of an optimal viewing distance of 3 m and a display diagonal of 42" with an aspect ratio of 16:9.

The first sub experiment (TV I) is designed with a lens system per sub-pixel.

The screen thus has a native 2D resolution of 11520×6480 (71 MP-6 times the FullHD resolution in both directions) and a lens pitch of 81 μm.

The second experiment (TV II) has an emitter system per pixel with a shared lens system. The screen has the same sub-pixel resolution but only 1920×1080 lenses and a corresponding lens pitch of 486 μm.

For the mobile phone case, typical values are assumed of an optimal viewing distance of 0.5 meters and a pixel pitch of 50 μm corresponding to 1000 pixels per 50 mm.

With suitable parameters, the invention is feasible for both applications.

For "big" emitter sizes the display is thicker for the application. These restrictions have most influence on the mobile phone case where only a narrow range of emitter sizes is acceptable in view of acceptable thickness of such devices incorporating the display. For example, the last row requires a spacing $d_{EA}$ of 2.5 mm.

For the TV case the tradeoff is likely influenced by a tradeoff between production cost and thickness.

Using this model, light rays have been traced from the pupil to the screen to numerically estimate the fraction of rays that hit the emitter. These experiments have been performed for case TV I with $f_A$=162 μm, $f_B$=81 μm, $d_{EA}$=12

Close to the maximum viewing angle, the gain can be set to make the screen go to black abruptly (0 gain) or with a transition (maximum gain or gain curve). With high dynamic range (HDR) content, it is possible that insufficient brightness can be generated for off-centre viewing. In case the output color is out of range, a suitable clipping method can be applied to prevent color errors. An example of a suitable (and known) clipping method is:

$$(R', G', B') = \frac{(R, G, B)}{\max_{c \in (1,R,G,B)} c}, \quad (21)$$

with $(R, G, B) \in [0,1]^3$.

The discussion above demonstrates that the required optical performance of the system can be achieved.

Figure 10A:
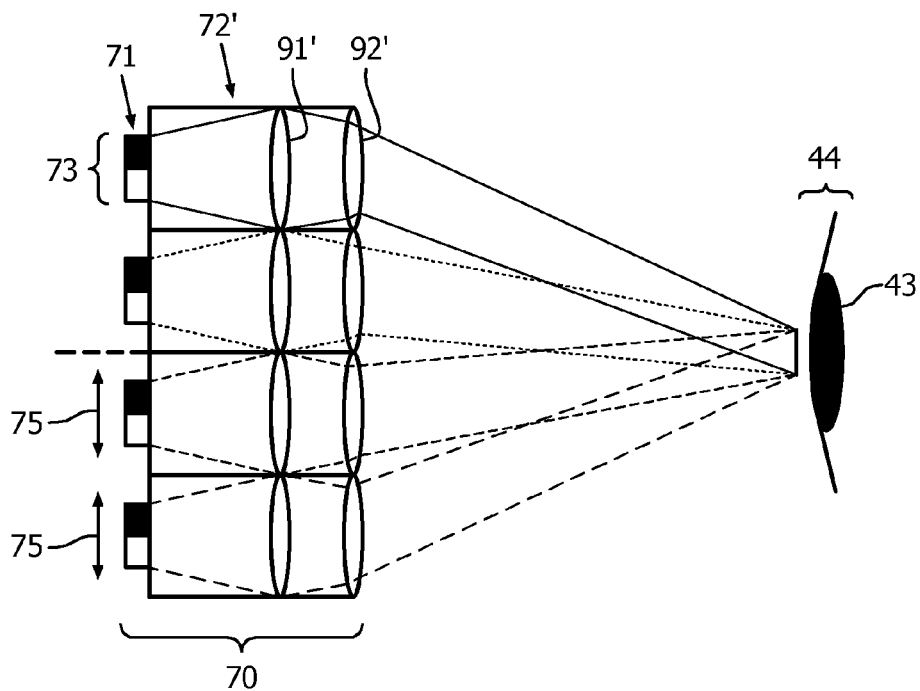
FIGS. 10 A and 10B show implementations of an optical unit according to FIG. 9 with a display panel with or without pixels with subpixels.
Figure 10B:
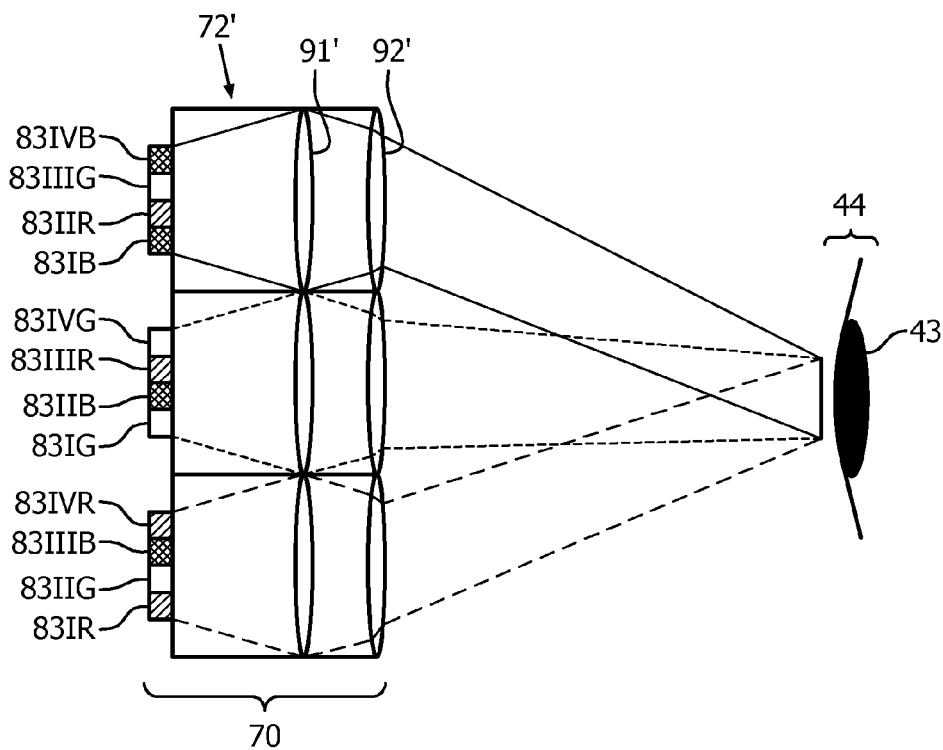

Implementation of such an imaging unit into the display of the invention can be done as illustrated in FIG. 10A or 10B.

FIG. 10A shows a display system 70 having a display panel as in FIG. 7B. The optical units 72 are built in accordance with the FIG. 9 having lenses 91 and 92. This system provides 2 views as described with reference to FIG. 7B.

FIG. 10B shows a display system 80 having a display panel as in FIG. 8G. The optical sub-units 82 are built in accordance with the FIG. 9 having lenses 91 and 92. This system provides 4 views as described with reference to FIG. 8G.

Figure 7D:
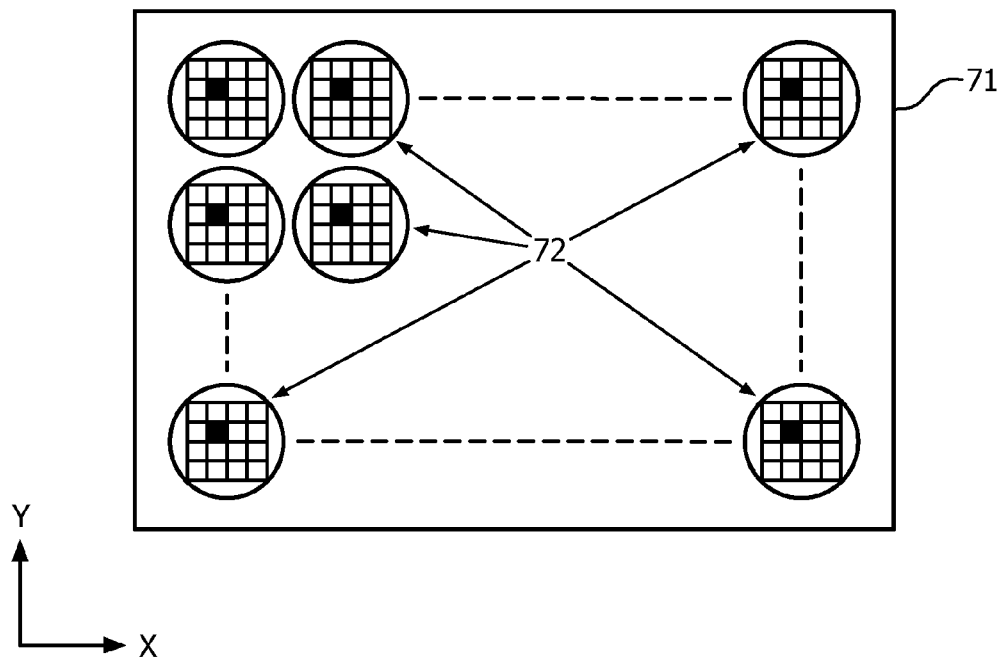
FIGS. 7D and 7E show the arrangement of pixels on the display panel and a possible design of the optical unit.

The panel used in these displays of FIG. 10 can have the pixel layout as in FIG. 7D with black areas in between the subsets of pixels of which two have been shown. Each individual light emitter in the shown subsets of pixels may be a pixel (black and white display) or a subpixel (color display). The number of sub-pixels may be chosen in accordance with any one of the examples described in relation to FIGS. 8A to G. The beam steering by lens displacement or stretching can be done as described in the US patent application publication number 2005/0270645 A1 by relative displacement of the lenses 91 and 92 (confer FIGS. 2, 3 4 6 etc in that reference).

Other panels may be implemented with the optical units in a similar manner.

The display device of the invention can be used without beam steering and or eye tracking (see further down below). Preferably however beam steering and eye tracking are used to correct for displacement of the viewer with respect to the display.

In one application, for viewing a screen from a distance, the invention is therefore implemented with beam steering and eye tracking. Optionally and preferably feedback is provided between the beam steering and eye tracking to improve the beam steering performance.

Beam steering solutions have been presented in P. F. McManamon, "A Review of Phased Array Steering for Narrow-Band Electrooptical Systems", in Proceedings of the IEEE, vol. 97 (6), 2009. Potentially suitable solutions for the optical unit are:

MEMS solutions such as microprisms, for example between fixed lenses;
Electrowetting microprisms;
GRINdex lenses;
Piezoelectric drive systems, such as stepper motors.

Suitable piezoelectric drive solutions with the required amount of movement are known, for example from scanning microscopy and from DVD optical control systems.

If all microlenses are for providing images to one pupil only at a time, it becomes possible to treat the microlens array as a single unit. This can simplify the drive mechanism, for example it only needs to control the relative position of the microlens array as a whole and the display panel pixel array. Similarly, if micro prisms or controllable lenses are used, they can all be controlled in parallel, to implement the common shift in direction of the emitted beams. One optical unit suitable for this purpose was described with reference to FIG. 7.

A preferred implementation of beam steering for the invention uses piezoelectric control of prisms, constructed so that the entire screen (or a large part of it) can be controlled at once.

Another preferred implementation uses electrically controlled lenses or lens surfaces based on electrowetting, or GRIN. Thus, the lenses of the optical unit in FIG. 7, or the lenses 91 and/or 92 of the optical unit having light directing elements 90 in e.g. FIG. 7, or FIG. 9 can be made of GRIN lenses. How such lenses may be designed and/or constructed is for example disclosed in WO 2007/072289 and WO 2007/072330. Such GRIN lenses can furthermore be modeled as disclosed in J. Opt. Soc. Am. A, pp. 3467-3477, 2007. Especially the multi-electrode GRIN lenses as described in the MSc. Engineering Physics thesis Multi-electrode liquid-crystal-based gradient index lenses for 2D/3D switchable displays of June 2009 by Steven L. Nyabero can be used for GRIN lenses in the optical unit of the invention. FIG. 3.6 in this thesis gives a schematic example of a simple multi-electrode GRIN lens that can be used in the optical unit of the invention. The references given herein also describe operation of such lenses in detail, which can be used for control of the optical units in the present invention. In view of these detailed descriptions in the references the construction and operation of GRIN lenses will not be repeated here in detail but only briefly described with regard to one example. This will then also provide guidance on implementation of other types of GRIN lenses.

Figure 11A:
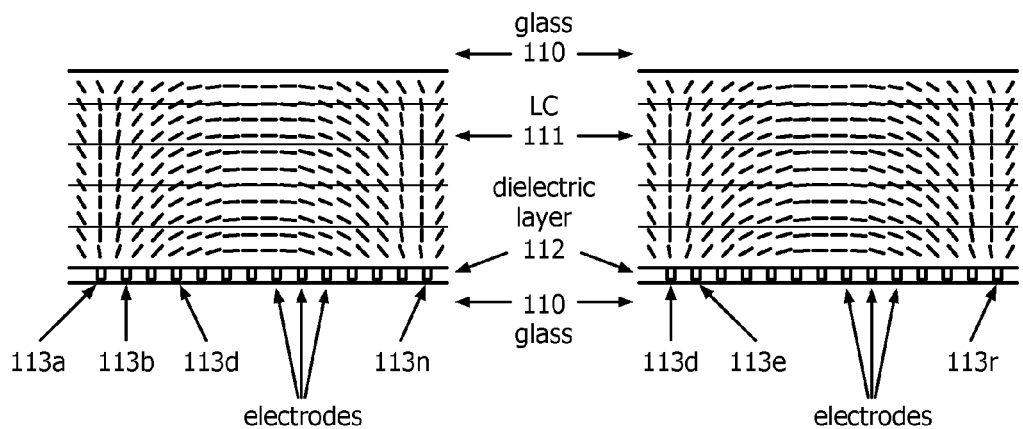

More specific, FIG. 11A shows two drawings of one GRIN lens. The lens comprises Liquid crystalline material 111 in between Glass layers 110. On one side of the Lens there is a electric dielectric layer 112 (for example made of silicon oxide) wherein multiple independently addressable electrodes 113 are defined. By providing the electrical signals (voltages) to the electrodes, the LC material can be made to realign its electrical directors (the electrical dipoles of the LC molecules, indicated with the multiple small black lines in the LC layer). In the left drawing the lens is formed in the LC layer in between the electrodes 113$a$ and 113$n$.

Adjusting the position of the lens can be done by shifting the voltage pattern provided to form a lens along the electrodes. Thus e.g. in the right drawing the same pattern for forming a lens is provided to a same amount of electrodes, but the lens now starts at electrode 113$d$ instead of electrode 113$a$. Hence the lens has shifted to the right compared to the situation of the left drawing. It will be evident that when the pattern per lens is altered in terms of the number of electrodes providing lens function, and/or voltage values per electrode, that also the size and shape of the lenses can be adjusted to accomplish beam steering as for example required for an imaging unit steering in FIG. 7 or FIG. 9. The redirecting of the beams like described in the US patent application publication number 2005/0270645 A1 by relative displacement of the lenses 91 and 92 (confer FIGS. 2, 3 4 6 etc in that reference) can now be done without mechanically moving solid lenses.

As said, the detailed construction of GRIN lenses can be found in the thesis or the non-prepublished international application PCT/IB2011/052149. The lenses described in the latter application have also a capping layer covering the electrodes that reduces or eliminates possible diffraction effects. See for example the examples given in FIG. 3 of the PCT/IB2011/052149.

Figure 11B:
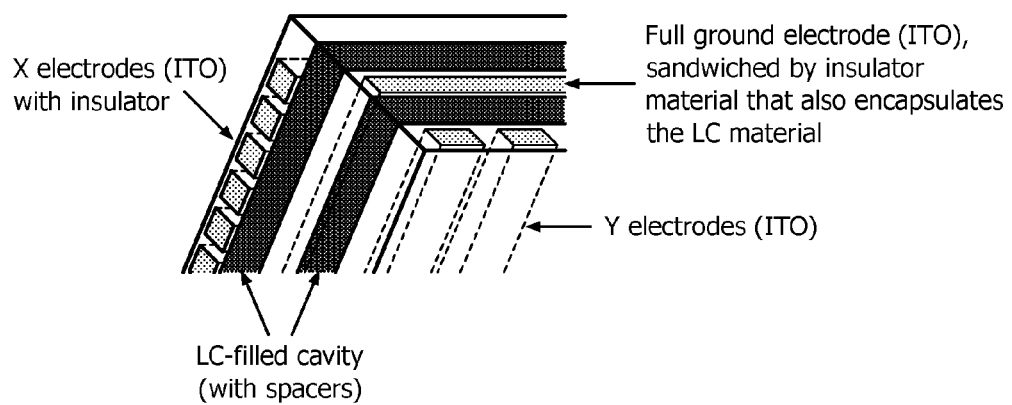

FIG. 11B shows an advantageous GRIN lens system essentially composed of two lens systems of FIG. 11B sandwiched together having an additional ground electrode layer for reduction of a number of optical effects. The element of FIG. 11B comprises a sandwich of two lenticular lenses, each based on a LC layer sandwiched between either X electrodes and the ground electrodes or Y electrodes and the ground electrodes. This can be advantageous as most GRIN designs have one big ground electrode covering one side of the LC. The ground electrode is so to speak shared between the lenticular sheets. Individual ones can however be used if needed. The sets of X and Y electrodes are rotated 90 degrees in respect to each other to obtain the microarray lens.

It is not a requirement for the two lenticular GRIN lenses to be combined. Instead they could be separated by glass or some other transparent material. Furthermore it is possible to add a conventional glass or polycarbonate microarray lens for focusing and use a steerable prism shape for the GRIN lenses.

In the optical unit of FIG. 11B, the X and/or Y electrodes (ITO) nearby the LC material are set to different voltages as described for multi-electrode GRIN lenses in e.g. the PCT/

1B2011/052149 or the thesis. The polarities are switched with 100 Hz to 1 kHz frequency to avoid charge effects due to ions in the LC material. An electric field forms in between the electrodes orienting the LC molecules according to the electric. Liquid crystal is birefringent so the refractive index depends on the orientation of the molecules in respect to the direction of the light. As a consequence a gradient in the refractive index is formed. Light is bent due to the gradient index. The amount of bending is approximately linear with the LC thickness. If the voltages set to the electrode are suitable, then the orientation pattern of the molecules in the LC material and thus the index gradient results in lens function of the LC material. Hence this light can be focused at some distance after passing through the LC layers.

Also electrowetting lenses can be used in the invention for integrating beam steering. Eelctrowetting lenses have been described in the U.S. Pat. No. 7,616,737 and/or U.S. Pat. No. 7,616,737, for example and their incorporation in a display of the invention will not be further described in detail here. The description here above provides guidance on how the lenses should be placed with respect to pixels etc, while the reference provides the details on how to build and use such lenses.

By altering the electrical control signal (voltage) pattern on the electrodes, it is again possible to adapt focal length of one or more of the lens layers therewith to not only switch on or off the lens function, but also to displace and/or asymmetrically distort the GRIN lens surface in order to steer the beam. How e.g. the lens displacement brings about this beam steering in a device such as that of FIG. 9, has been explained herein before with reference to FIG. 9 and FIG. 7A.

An eye tracker is used to track one or more pupils in front of the display. There is a trade-off between having more views and projecting them around the pupil and having a more accurate eye tracker.

As in the article "Holographic 3-D Displays—Electroholography within the Grasp of Commercialization" referenced above, even though the eyes are tracked, the display content depends only on the origin and direction of the light beams; micro movements of the eye do not cause artifacts. With bigger movements the latency of the system should be such that the beam steering adjustment is practically instantaneous.

A reaction within the time of one video frame (~20 ms) is considered appropriate. A temporal mismatch is likely to be perceived only as a drop in intensity.

Most off-the-shelf eye tracking systems have the following components:
IR camera;
Active IR illumination;
Real-time image analysis; and
Feedback.

To assist the control of the beam steering in conjunction with eye tracking, visual feedback can be used in the display control system to automatically correct the link between eye tracking and beam steering.

Figure 12A:
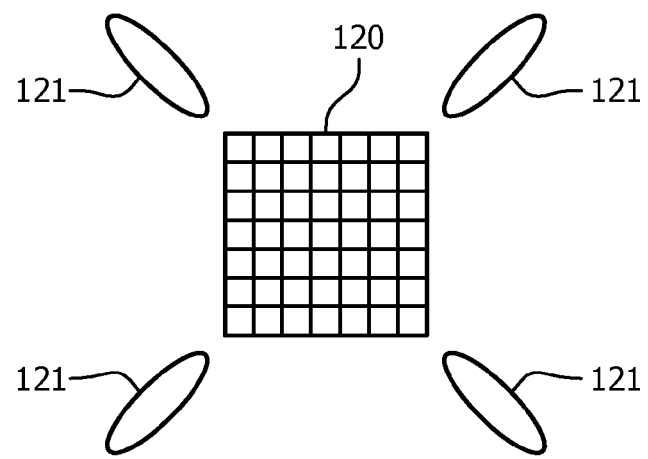
FIGS. 12A and 12B show view areas that can be provided to the pupil of an eye. They can also represent pixel patterns within a subset of pixels on the display panel.
Figure 12B:
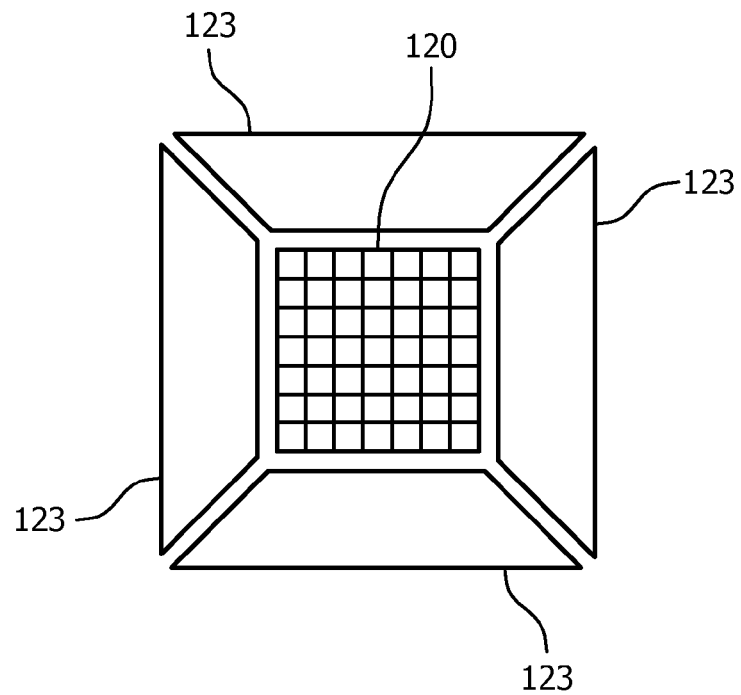

FIG. 12 shows the pattern projected on the pupil. The grid 120 in the centre represents the pixilated output from the optical unit. For example there may be a set of 7×7 subpixels under a microlens system for providing such a pattern in the projection area (to the Pupil (7×7 sub-array in this example). The four markers 121 around the corner represent an IR pattern that is projected on the viewer's eye region. This is possible since in many cases only a small part of the pupil area is necessary of providing the pattern 120 to in case of for example direct emitter pixel panels. It is therefore possible to include additional emitters on the display panel that provide additional functionality such as the IR beams.

The IR markers are tracked by the IR camera of the eye tracking system and allows for a visual control loop in the beam steering process. The IR cross can be always on or behave as a structured light; for instance scanning all rows or columns or with a more intricate (structured) pattern.

By having IR crosses turn on or off in a pattern it becomes possible over time to identify the contribution of groups of crosses. With ideal alignment, all crosses would be on top of each other. If there is a mismatch, then by studying the pattern of crosses, it becomes possible to find out how to correct the beam steering process to compensate for the mismatch.

A simple form of structured light is to flash all IR crosses one by one. This would take a long time for the entire display. However other patterns are possible that flash groups of IR crosses (i.e: first left side, then right side of screen). One option is to divide the screen into a grid such that every N frames all cells in the grid have been flashed.

In the TV example the emitter has a pixel size of about 0.5 mm that is magnified by 100-500×, giving a maximum pattern size of 50-250 mm. In all cases the IR cross can be big enough to produce a pattern on the skin surrounding the eyes.

As can be seen from Table 1 above, the preferred size of emitters is in the order of a few μm, to enable several views to be projected into a single pupil.

With only a single, small emitter per pixel of the sub-array, it is particularly challenging for the view to be perfectly directed to the viewers eye.

Figure 7E:
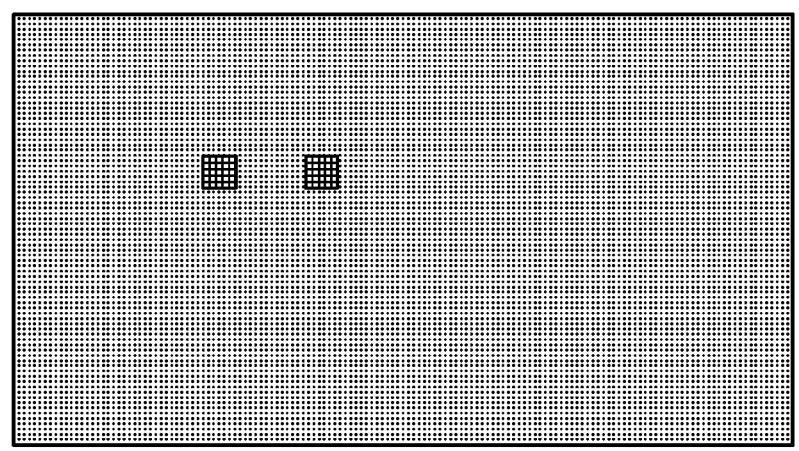

The pixel area on the display panel may have most of its area black as the aperture can be small (see FIG. 7E where two (sub)-pixel clusters are shown within one pixel panel) when optical units as e.g. described in FIG. 9. are used. An example is given in FIG. 12B where next to the array 120 of view per pupil generating sub-pixels and the optional. The black area (or non light providing area around sub-sets of pixels projected by one optical unit) can be filled with additional view pixels 123. These may have a larger area than the ones for providing the multiple views per pupil that form the bases for the free focus. Having the larger view pixels may have the advantage that when optical unit steering is not accurate with respect to position, or speed of adjustment when viewers move in front of the display, the image is not lost entirely, as then the larger pixels are imaged to the eye, such that although the multiple views per pupil may be lost, the viewer still observes the image has was watching. The viewer thus loses (temporarily) free focus function, but not the image, which is far less disturbing when compared too losing the entire image due to view steering mismatch.

A further modification uses sub-pixels that are divided into multiple smaller areas that are distributed but carry the same sub-pixel information.

A preferred layout of light emitting areas in a pixel for this display device uses a multiplicity of emitters, with a size much smaller than that of the pixel, separated by a distance greater than the size of the emitters.

Figure 13A:
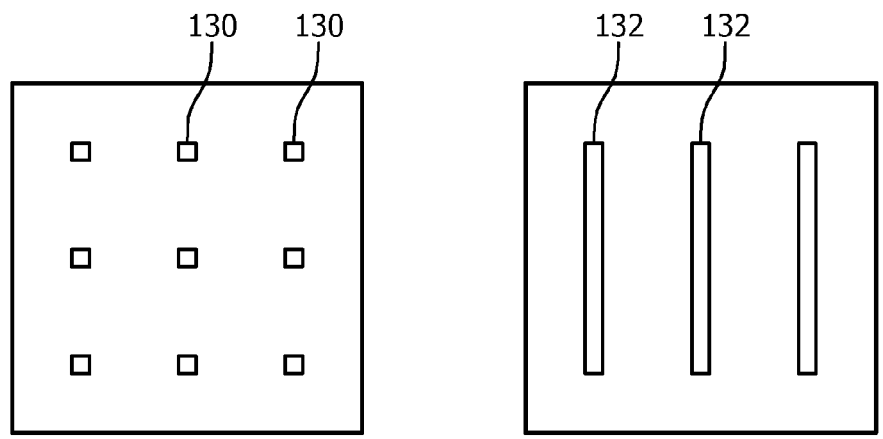
FIGS. 13A and B shows pixels or subpixels that are subdivided in multiple illumination portions providing the same output when addressed and how this can be achieved by simple electrical connection.

Two examples are shown in FIG. 13A.

The first example on the left is suitable for 2D beam steering with multiple views per pupil in both spatial directions. The pixel comprises an array of sub-pixels 130 in a regular 2D grid. The second example on the right has a series of column shaped emitters 132, and is more suitable for a system with only horizontal parallax.

The multiple emitters can all display the same information. In this manner, several (identical) views are produced and projected in different directions, which simplifies the optical (tracking) system by choosing the most suitable subpixel (i.e that closest to the viewers eye) and carrying out only minimal lens fine tuning for projection into the pupil.

The pixel aperture is intentionally far below the maximum available aperture. This results in major power savings, as the intensity of the emitters do not exceed that of a traditional display (same Cd/m2), whilst the total area of the emitters is far smaller than if the pixel aperture were larger. The viewer notices no difference in display intensity. The power saving manifests itself in that the display simply does not send out light in directions where no viewers are sitting.

Many other different pixel layouts may be realized within the scope of this concept. Generally, the spacing between different subpixels will exceed the size of the subpixels themselves.

The size of the emitters will be around 1-10 μm and the spacing of the sub-pixels should be sufficient to prevent multiple sub-pixels from projecting into both eyes. In this case, the spacing between emitters should be typically in excess of 50-100 μm—defined by the ratio of pupil size to spacing between the eyes of around a factor of 10.

Figure 13B:
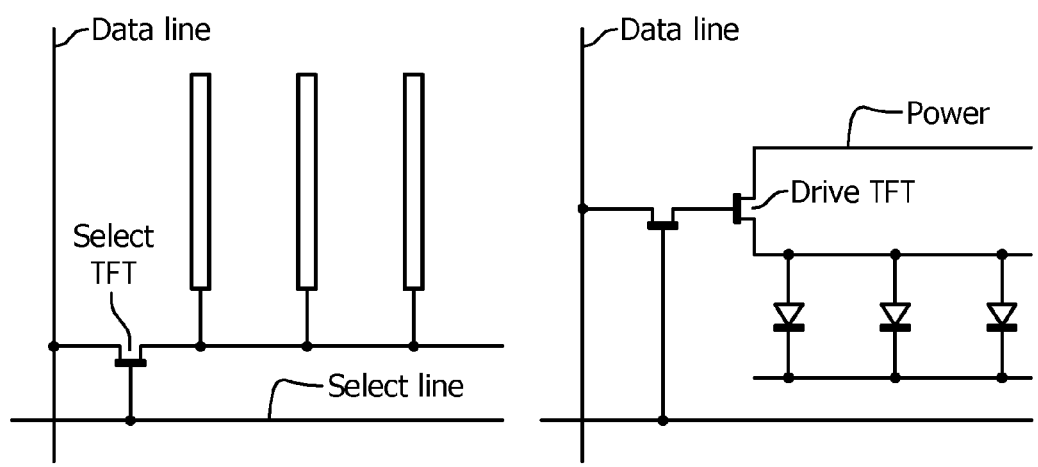

Whilst this pixel design requires a multiplicity of sub-emitters per pixel, this does not necessarily result in a more complicated addressing of the display. This is illustrated in FIG. 13B for the case that the display is either an LCD based display (left hand side) or an OLED based display (right hand side). In both cases, the display is addressed in an active matrix manner, making use of just a single data line per pixel (column), and a single select line and select transistor. This is achieved by connecting all emitting areas to the same data line through the addressing transistor.

Preferably, the emitter electrodes are realized in a single mask layer in the display process, as this makes definition, spacing and alignment of the emitters more reliable.

The system needs to be able to generate the multiple images, for example by image rendering from a 3D model.

Taking the example of a 5×5 sub-array, there are 25 different images generated for the pupil, and this set of 25 images is based on the pupil position.

Figure 14:
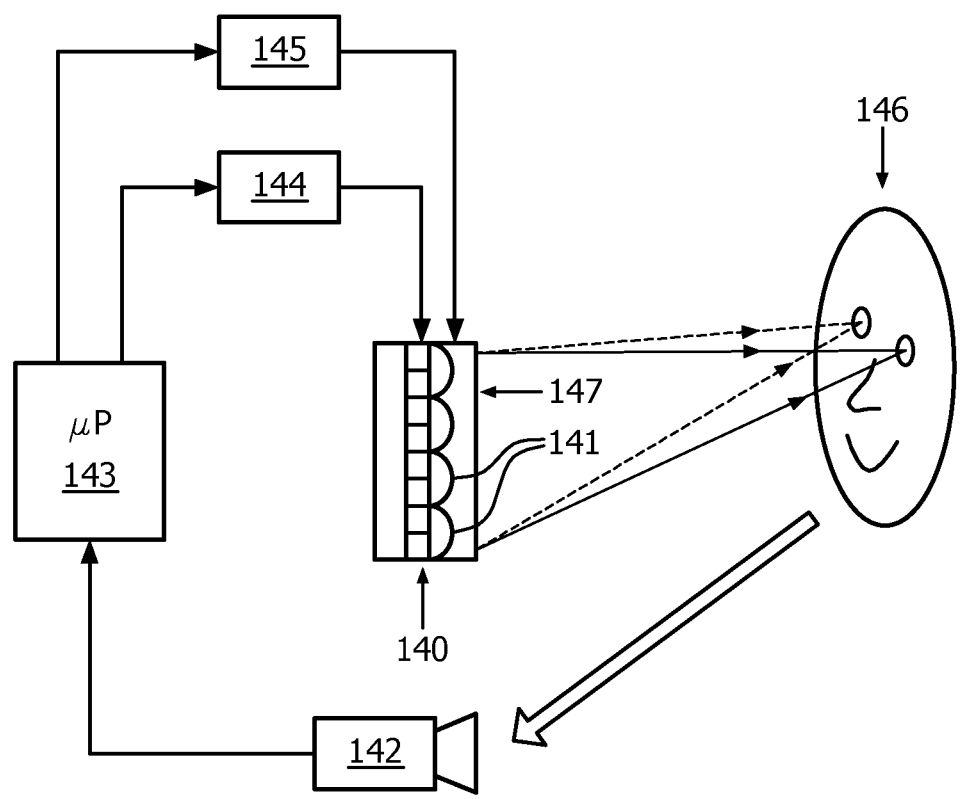
FIG. 14 shows a display device according to the invention having also a tracking system, display controller and optical unit controller.

The display system of the invention is schematically represented in FIG. 14. The system comprises a display panel with a pixel array 140 and an imaging unit 147 with imaging subunits 141 in the form of an array. A camera 142 implements eye tracking and feeds this information to the device controller 143. This controls the image rendering in the display driver 144 as well as controls the beam steering through control system 145.

The output across the field of view for the system operating with a single viewer 146 can be represented with the picture in FIG. 7E. Only imaging to tow pupils is generated (either simultaneously or time-sequentially) like described with reference to FIGS. 4D and 4E. Each subpixel of each subs-array encodes (at least one color of) the entire image from a single viewing direction. The images can be for a monoscopic display or a stereoscopic display. These may be rendered internally or externally form the device and then fed to the device.

As mentioned above, one pupil may be provided with its combination of sub-array images at a time. Furthermore, the pixels within a sub-array are not necessarily illuminated simultaneously. The pixels of the sub-array under a microlens can be scanned in sequence. This would be the case for a scanned laser system. A directly emitting pixel (Electroluminescent (EL or OLED) may have scanning of the display panel pixel array row-by-row (i.e. in conventional manner), which again will not result in simultaneous illumination of all pixels of a sub-array. In this case, there will be a pause between the scanning of one row of pixels of the sub-array and the scanning of the next row of pixels of the sub-array. However, in all cases, integration by the eye means that it is simply required that the different pixels of the sub-array are imaged to different areas of the pupil with the frame period of the display.

The display of the invention, like the one described with reference to the FIGS. 4 to 6, can be used in different systems. One way would be as part of a one eye goggles based system (these are e.g. found in the military). Especially for one eye systems the free focus may result in improved viewing experience relating to less fatigue and faster image detail detection. Alternatively, one or more displays may be part of a two eyes based display system (goggles or other such as TV or monitor). Either one display device may provide the information for the two eyes, or two display devices may be used, one for each eye. The system may then be a 2D display in which the one or more displays provide the same information to the two eyes. Alternatively, the system may be a 3D display system providing multiple views to each eye simultaneously while these sets of multiple views also differ with regard to the parallax of the eyes. This replicates the incoming light that would be seen by each eye both globally (as in a stereoscopic display) and locally at the level of differences in images seen at different parts of retina of one eye such that not only free focus effect for each eye is allowed, but also the 3D scene is stereoscopically viewable.

In the goggles based system the eyes can easily have two display systems, one for each eye.

The system may be switchable between the above described 2D and 3D options. Especially for the goggles with one display per eye this is easily implemented by choice of information provided to either display, being the same for 2D or different for 3D. in other systems the view rendering and view assignment may be adjusted to do the same.

All references to other documents and articles are hereby incorporated by reference.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A display device comprising:
 a display panel comprising a set of pixels the pixels being spatially distributed over the display panel, and each pixel being for providing a light output, the set of pixels comprising a plurality of different subsets of pixels, each subset of pixels comprising one or more pixels of the set of pixels, and
 an imaging unit that provides the light output of the one or more pixels of a subset of pixels to form pixel images on a plurality of view areas on an imaginary plane located at a first distance in front of the display, wherein the display panel provides a 3D display of a scene, wherein each view area of the plurality of view areas represents a view of the scene from a different viewpoint, wherein the plurality of view areas do not overlap each other, wherein each subset of pixels is associated with an imaging subunit of a plurality of imaging subunits, wherein each imaging subunit of the plurality of imaging subunits directs the light output of the subsets of pixels associated with the imaging subunit to the plurality of view areas, wherein the imaginary plane comprises an imaginary circle having a diameter equal to or smaller than that of the pupil of an eye, wherein the imaginary circle completely encloses at least two of the plurality of view areas, wherein, in a first time interval, each imaging unit provides the light output of a first subset of pixels to a first view area, and in a second time interval, each imaging unit provides the light output of the first subset of pixels to a second view area.

2. The display device of claim 1, wherein the light output of a first pixel of the one or more pixels of a subset of pixels is reconfigurable from a first light output to a second light output different from the first light output within a reconfiguration time interval that is equal to, or shorter than 1/30 seconds.

3. The display device of claim 1, wherein the plurality of view areas comprises three view areas and the imaginary circle encloses at least a part of the three view areas.

4. The display device of claim 1, wherein each imaging subunit provides the light output of at least a part of one or more of the pixels of only one subset of pixels, and wherein each imaging subunit comprises an optical element in the form of at least one of a lens, a mirror, and a prism.

5. The display device of claim 4, wherein there are more than one imaging subunits that provide the light output of the at least part of one or more of the pixels of only one subset of pixels.

6. The display device of claim 4, wherein the imaging subunit comprises a first optical element and a second optical element, where the first and second optical element are arranged such that the first optical element directs the light output of the at least a part of one or more of the pixels of only one subset of pixels to the second optical element and that the second optical element directs the at least part of the light output received from the first optical element to the imaginary plane.

7. The display device of claim 4, wherein the optical elements are lenses and the imaging subunits are arranged in an array of imaging subunits.

8. The display device of claim 4, wherein each pixel comprises a plurality of subpixels, wherein the plurality of subpixels comprises mutually different colors and wherein the subpixels are stacked on top of each other on the display panel such that they at least partly overlap.

9. The display device of claim 1, wherein each pixel comprises a plurality of subpixels, wherein the plurality of subpixels comprises mutually different colors and wherein the subpixels are spatially distributed over the display panel so that they do not overlap.

10. The display device of claim 9, wherein the number of subpixels within a pixel is equal to the number of imaging subunits that image the at least a part of one or more of the pixels of only one subset of pixels.

11. The display device of claim 9, wherein each pixel, or subpixel comprises a plurality of illumination portions arranged as a one, or two dimensional array of illumination portions.

12. The display device of claim 9, wherein a distance between subsets of pixels is larger than a distance between pixels or subpixels of a subset of pixels.

13. The display device of claim 1, wherein the imaging unit also provides the light output of the one or more pixels of a subset of pixels to form further pixel images on a further plurality of view areas on the imaginary plane, the further plurality of view areas not overlapping each other, wherein at least one further pixel image of each one of the different subsets of pixels overlapping on a same one of the further plurality of view areas, the imaginary plane comprising an imaginary further circle having the diameter of the pupil of an eye, the distance between the centers of the imaginary circle and the imaginary further circle corresponding to the distance between the centers of the pupils of a left and right eye of a viewer and the imaginary further circle enclosing at least a part of at least two of the further plurality of view areas, where the at least two of the further plurality of view areas at least partly enclosed within the imaginary further circle differ from each other with respect to at least one of the further pixel images therein.

14. The display device of claim 1, wherein:
the set of pixels comprises a further plurality of different subsets of pixels, each subset of pixels of the further plurality of subsets of pixels comprising one or more pixels of the set of pixels,
the imaging unit also provides the light output of the one or more pixels of a subset of pixels of the further plurality of subsets of pixels to form further pixel images on a further plurality of view areas on the imaginary plane, the further plurality of view areas not overlapping each other, wherein at least one further pixel image of each one of the different subsets of pixels overlapping on a same one of the further plurality of view areas, the imaginary plane comprising an imaginary further circle having the diameter of the pupil of an eye, the distance between the centers of the imaginary circle and the imaginary further circle corresponding to the distance between the centers of the pupils of a left and right eye of a viewer and the imaginary further circle enclosing at least a part of at least two of the further plurality of view areas, where the at least two of the further plurality of view areas at least partly enclosed within the imaginary further circle differ from each other with respect to at least one of the further pixel images therein.

15. The display device of claim 13, wherein between the centers of the imaginary first circle and the imaginary second circle there is an area on the imaginary plane where no view areas exist.

16. The display device of claim 14, wherein the display device is a stereoscopic display device and at least two of the plurality of view areas at least partly enclosed within the imaginary circle and the at least two of the further plurality of view areas at least partly enclosed within the imaginary further circle differ from each other with respect to at least one of the pixel and further pixel images therein.

17. The display device of claim 14, wherein the plurality of subsets of pixels are arranged in an array of subsets of pixels having k rows and l columns, wherein k and l are integers.

18. The display device of claim 17 wherein the plurality of subsets of pixels and the further plurality of subsets of pixels are arranged in an array of subsets of pixels having rows and columns, wherein the subsets of pixels of the plurality of subsets of pixels are in odd numbered columns, and the subsets of pixels of the further plurality of subsets of pixels are in even numbered columns.

19. The display device of claim 14, wherein the imaging unit is reconfigurable to sequentially provide at least one of:
the light output of the pixels of the plurality of subsets of pixels to the different ones of the plurality of view areas within at least one of the imaginary circle and the imaginary further circle, and
the light output of the pixels of the plurality of subsets of pixels and the further plurality of subsets of pixels to the plurality of view areas and the further plurality of view areas.

20. The display device of claim 19, comprising:
a tracking system that determines the position of a pupil of an eye, and
an imaging unit control system that controls the imaging unit in dependence of the position of the pupil of an eye such that at least one of the imaginary circle and the further imaginary circle when coinciding with one or more pupils of the eyes of a viewer is substantially kept to coincide with these pupils when one or more of the pupils change position.

21. The display device of claim 19, wherein the display device further comprises a display controller that provides image data to the display panel, wherein the image data encodes a plurality of subimages, a first one of the plurality of subimages corresponding to a first viewpoint of the scene and a second one of the plurality of subimages corresponding to a second viewpoint of the scene related to the first viewpoint by the width of the pupil of an eye and wherein to each subset of pixels there is provided a portion of the first subimage and a portion of the second subimage.

22. The display device of claim 4, wherein each imaging subunit is individually controllable to implement a desired beam steering function.

23. The display device of claim 19, wherein the imaging unit includes a GRIN lens that redirects the light output of the first subset of pixels from the first view area to the second view area.

24. The display device of claim 19, wherein the imaging unit includes a liquid crystal (LC) material that redirects the light output of the first subset of pixels from the first view area to the second view area.

25. The display device of claim 19, wherein the imaging unit includes a first lens and a second lens, and wherein the imaging unit redirects the light output of the first subset of pixels from the first view area to the second view area by changing the location of a first lens relative to the second lens.

26. The display device of claim 19, wherein the imaging unit redirects the light output of the first subset of pixels from the first view area to the second view area via a change in a physical dimension of the imaging unit.

27. The display device of claim 19, wherein the imaging unit redirects the light output of the first subset of pixels from the first view area to the second view area via a change of location of the imaging unit relative to the first subset of pixels.

* * * * *